(12) United States Patent
Barrett et al.

(10) Patent No.: US 7,050,669 B2
(45) Date of Patent: May 23, 2006

(54) OPTICAL CROSS CONNECT SWITCH WITH AXIAL ALIGNMENT BEAM

(75) Inventors: Todd Barrett, San Diego, CA (US);
Chris Sexton, San Diego, CA (US);
Donald Bruns, San Diego, CA (US);
Dave Sandler, San Diego, CA (US);
Hus Tigli, La Jolla, CA (US)

(73) Assignee: Trex Enterprises Corp., San Diego, CA (US)

( * ) Notice: Subject to any disclaimer, the term of this patent is extended or adjusted under 35 U.S.C. 154(b) by 157 days.

(21) Appl. No.: 10/838,070

(22) Filed: May 3, 2004

(65) Prior Publication Data

US 2005/0152638 A1    Jul. 14, 2005

Related U.S. Application Data

(63) Continuation-in-part of application No. 09/846,879, filed on Apr. 30, 2001, now Pat. No. 6,731,833, which is a continuation-in-part of application No. 09/960,225, filed on Sep. 20, 2001, now abandoned, which is a continuation-in-part of application No. 10/677,590, filed on Oct. 2, 2003.

(51) Int. Cl.
*G02B 6/26* (2006.01)

(52) U.S. Cl. .............................. 385/17; 385/16; 385/19; 385/24; 385/31; 385/33

(58) Field of Classification Search ...................... None
See application file for complete search history.

(56) References Cited

U.S. PATENT DOCUMENTS 6,320,993 B1 *  11/2001  Laor ............................ 385/16

6,944,403 B1 *  9/2005  Margalit et al. ............ 398/129

* cited by examiner

*Primary Examiner*—Juliana Kang
(74) *Attorney, Agent, or Firm*—John R. Ross

(57) ABSTRACT

An optical cross connect switch. In this switch any optical fiber in an input set of optical fibers, each carrying a communication beam, can be cross connected to any optical fiber in an output set of optical fibers. An alignment beam is added to and aligned co-axially with the communication beam carried by each fiber in the input set of optical fibers to define a communication-alignment beam for each fiber. Each communication-alignment beam is directed within a confined optical pathway to a specific exit aperture in an input array structure. The exit apertures for all of the communication-alignment beams are arranged in a pattern defining an input array so that each communication-alignment beam can be identified by the location of its exit aperture in the input array structure. Each communication-alignment beam is formed into a cross-connection beam by a micro-lens in a first lens micro-lens array. Each cross-connection beam is directed to a lens in a second lens array by two mirrors, a first mirror in a first mirror array and a second mirror in a second mirror array. The lens in the second micro-lens array focuses the communication beams into a specific input aperture of a confined optical pathway, preferably an optical fiber, in an output array structure. Each of the confined optical pathways in the output array structure is optically connected to an optical fiber of an output set of optical fibers. A first detector array located near the second lens array monitors the position of each alignment beam and provides position information to a processor for control of the mirrors in at least one of the mirror arrays.

23 Claims, 26 Drawing Sheets

IN THE MIS-ALIGNED STATE, CMOS IMAGE SENSOR PIXELS DETECT AND CHARACTERIZE MISALIGNMENT

CHECK. RETURN TO ALIGNED STATE

4 INCH WAFER
73
18 X 18 MIRROR ARRAY 70, 64, 66, 72, 72, 68, 68, 80A, B, C, and D

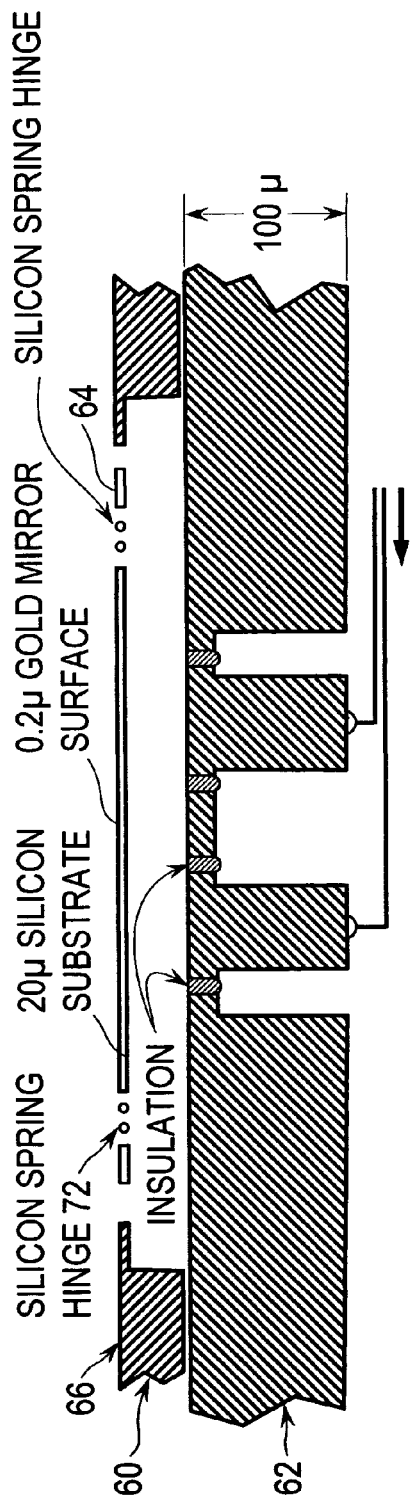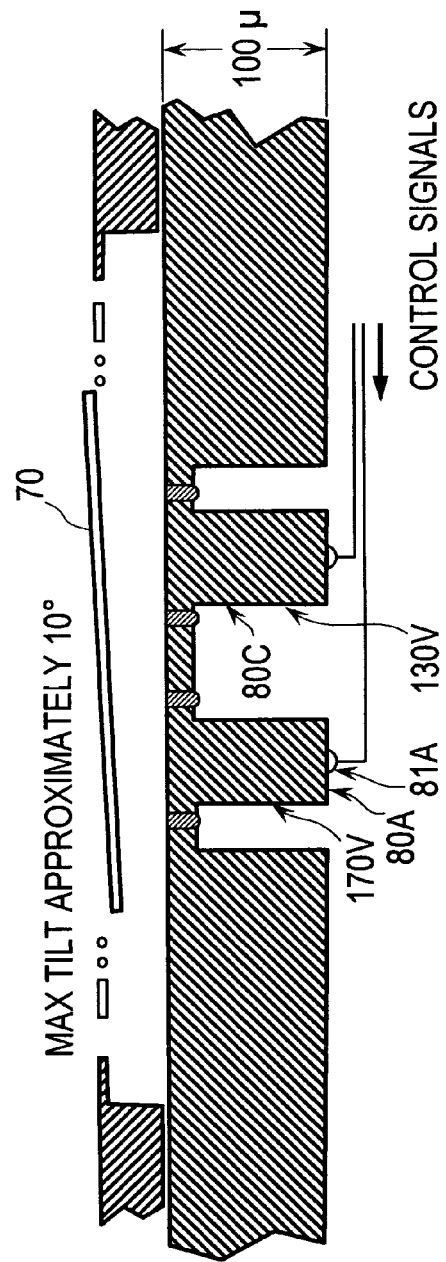
FIG. 9D
FIG. 9E

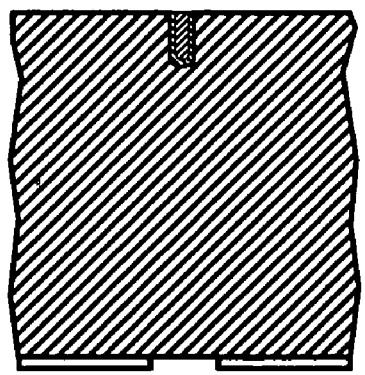 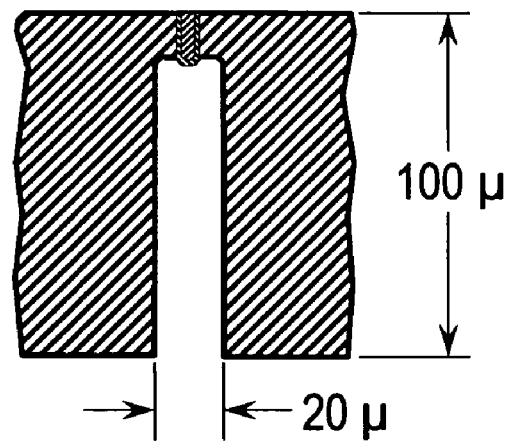
FIG. 10I　　FIG. 10J
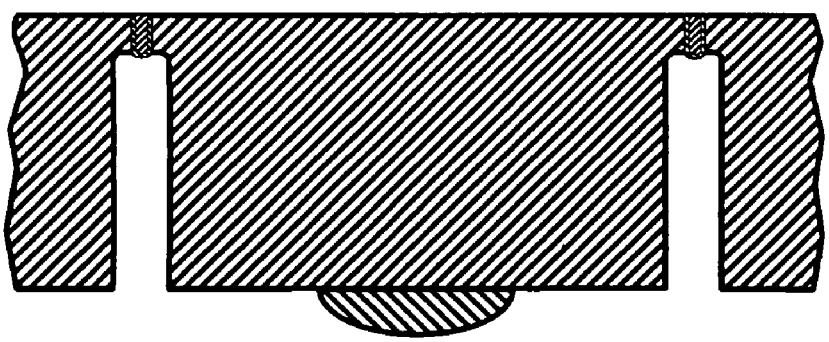
FIG. 10K

OPTICAL CROSS CONNECT SWITCH WITH AXIAL ALIGNMENT BEAM

RELATED APPLICATIONS

This Application is a Continuation-In-Part of U.S. patent applications, Ser. No. 09/846,879 filed Apr. 30, 2001 now U.S. Pat. No. 6,731,833 and Ser. No. 09/960,225 filed Sep. 20, 2001 now abandoned and Ser. No. 10/677,590 filed Oct. 2, 2003.

FIELD OF THE INVENTION

The present invention relates broadly to fiber optic communication systems. More particularly, the present invention relates to optical cross connect switches for such systems.

BACKGROUND OF THE INVENTION

Fiber Optic Communication

Over the past several decades, the telecommunications industry has exploded, and the incorporation of optical fiber into this industry is revolutionizing the way information is transmitted. Communication systems which use optical fiber as the transmission media offer some significant advantages over past copper-based systems. These advantages include higher bandwidths and transmission rates, lower transmission losses, and greater signal isolation. There exist in the United States many million miles of optical fibers. Information must be routed through this maze of fibers at the speed of light from millions of transmitters to millions of receivers.

Fiber Optic Multiplexing, Switching and De-Multiplexing

In a typical fiber optic communication system several fibers may be bundled together with many separate signals are combined within the light beam carried in each of the fibers in the bundle. This combination of separate signals into a single beam carried by a single fiber is called multiplexing the signals. Both time division and frequency division multiplexing may be utilized. In typical fiber optic systems each signal carries with it a code so that traffic controls in the system can direct the signal to its proper destination. Light beams comprised of many signals typically travel serially through several or many fibers before reaching its sub-destination or final destination. Individual signals are collected into a single fiber in a process called multiplexing and separated out from other signals in a beam in processes called de-multiplexing. This operation may occur once or several times during the transit of information in the form of these light signals from sender to receiver.

Multiplexing and De-Multiplexing

FIG. 13 A depicts de-multiplexing and FIG. 13B depicts multiplexing. FIG. 13C shows a prior art static cross connection with two de-multiplexers and two multiplexers showing how signals carried at four separate wavelength ranges on two separate fibers can be switched to two other fibers. Optical filters that transmit a single wavelength range and reflect all other wavelength ranges are often used to separate wavelength ranges in multiplexers and de-multiplexers. A well known filter is the thin film filter as shown in FIG. 13D. These filters are typically built up on a glass substrate with thin films of one or more sets of ¼ wave dielectric reflectors on both sides of a ½ wave cavity. FIG. 13E shows the result of one, two and three sets of ¼ wave reflectors and ½ wave cavities. FIG. 13F shows how these narrow band filters can be used to produce a de-multiplexer. A multiplexer results from switching the directions indicated by the arrows.

Traffic controls can route a particular signal from sender through many fibers to the receiver without changing the way the various optical fibers of the system are connected. However, as particular fiber routes become crowded, the connections between fibers must be modified to reduce the crowdedness or to route the signals more efficiently. This is the job of the fiber optic switch. Historically, the switching of optical-beam routes through optical fibers has been accomplished using hybrid optical-electrical-optical switches for detection and conversion of optical signals entering the switch from a first fiber to an electrical signal that is used to produce a new optical signal for transmission over a second optical fiber.

Optical Cross Connect Switches

Recently, a number of optical cross connect switches have been proposed in order to switch optical signals directly from one fiber to another, thereby eliminating the need to convert the optical signal to an interim electrical signal. These optical switches incorporate various optical switch elements, such as mirrors, prisms, fiber collimators, and complicated drive mechanisms, to route optical signals through the switch. For some optical switches, tiny mirrors known as MEMS mirrors have been proposed. These are lithographically produced mirrors that are operated with voltage signals applied through integrated circuits produced with similar lithographic techniques. Due to the extremely tight tolerances necessary for proper angular alignment of the various reflective elements, and because the open-loop responses of these reflective elements is insufficient to step perfectly into position, very sophisticated feedback control systems may be used, often resulting in these switches being prone to failure and requiring significant maintenance. Cross connect switches are also useful in combination with multiplexers and de-multiplexers for adding and dropping signals at specific wavelengths. Units for doing this are called reconfigurable optical add drop multiplexers or "ROADM's".

Reconfigurable Optical Add Drop Multiplexers

FIG. 13G shows an add-drop unit comprised of multiplexers and de-multiplexers but no switch. This unit would be considered a static unit and requires an operator to reconfigure it. FIG. 13H is a similar unit but with an optical switch that can be remotely operated or programmed to operate automatically. This unit includes tunable transponders permitting control of the wavelengths added. FIG. 13I shows a ROADM comprising four separate optical switches for switching signals among fibers as well as controlling the adding and dropping of signals for local service.

The Need

As the telecommunications industry continues to develop and grow to service more and more customers, the need for large scale, reliable optical switches will increase. Consequently, there is a need for an optical cross connect switch which can be readily integrated into existing telecommunications systems, and which can reliably switch optical signals from each fiber of an array of input fibers, to each fiber in an array of output fibers, and which can accomplish this switching quickly, with minimal power loss and at a minimal cost per channel.

SUMMARY OF THE INVENTION

The present invention provides an optical cross connect switch. In this switch any optical fiber in an input set of optical fibers, each carrying a communication beam, can be cross connected to any optical fiber in an output set of optical fibers. An alignment beam is added to and aligned co-axially with the communication beam carried by each fiber in the input set of optical fibers to define a communication-alignment beam for each fiber. Each communication-alignment beam is directed within a confined optical pathway to a specific exit aperture in an input array structure. The exit apertures for all of the communication-alignment beams are arranged in a pattern defining an input array so that each communication-alignment beam can be identified by the location of its exit aperture in the input array structure. Each communication-alignment beam is formed into a cross-connection beam by a micro-lens in a first lens micro-lens array. Each cross-connection beam is directed to a lens in a second lens array by two mirrors, a first mirror in a first mirror array and a second mirror in a second mirror array. The lens in the second micro-lens array focuses the communication beams into a specific input aperture of a confined optical pathway, preferably an optical fiber, in an output array structure. Each of the confined optical pathways in the output array structure is optically connected to an optical fiber of an output set of optical fibers. A first detector array located near the second lens array monitors the position of each alignment beam and provides position information to a processor for control of the mirrors in at least one of the mirror arrays. In a preferred embodiment a dichroic beam splitter located optically between the first and second mirror arrays directs a first portion of the alignment beam to a second detector array that monitors beam direction of said first portion of each alignment beam and provides beam direction data to a processor programmed to control positions of the mirrors in the first mirror array. Preferably the first detector array is transparent to the communication beams permitting alignment beam detection while allowing the communication beams to pass through the detector array to the input apertures of the confined pathways in the output array structure. In this preferred arrangement the first detector array is optically located between the second lens array and the input aperture of a confined optical pathway in an output array structure.

BRIEF DESCRIPTION OF THE DRAWINGS

FIGS. 9A through 9E show features of MEMS mirror used in a preferred embodiment of the present invention.

FIGS. 10A through 10K show techniques for fabricating MEMS mirrors for preferred embodiments of the present invention.

DETAILED DESCRIPTION OF PREFERRED EMBODIMENTS

Figure 1A:
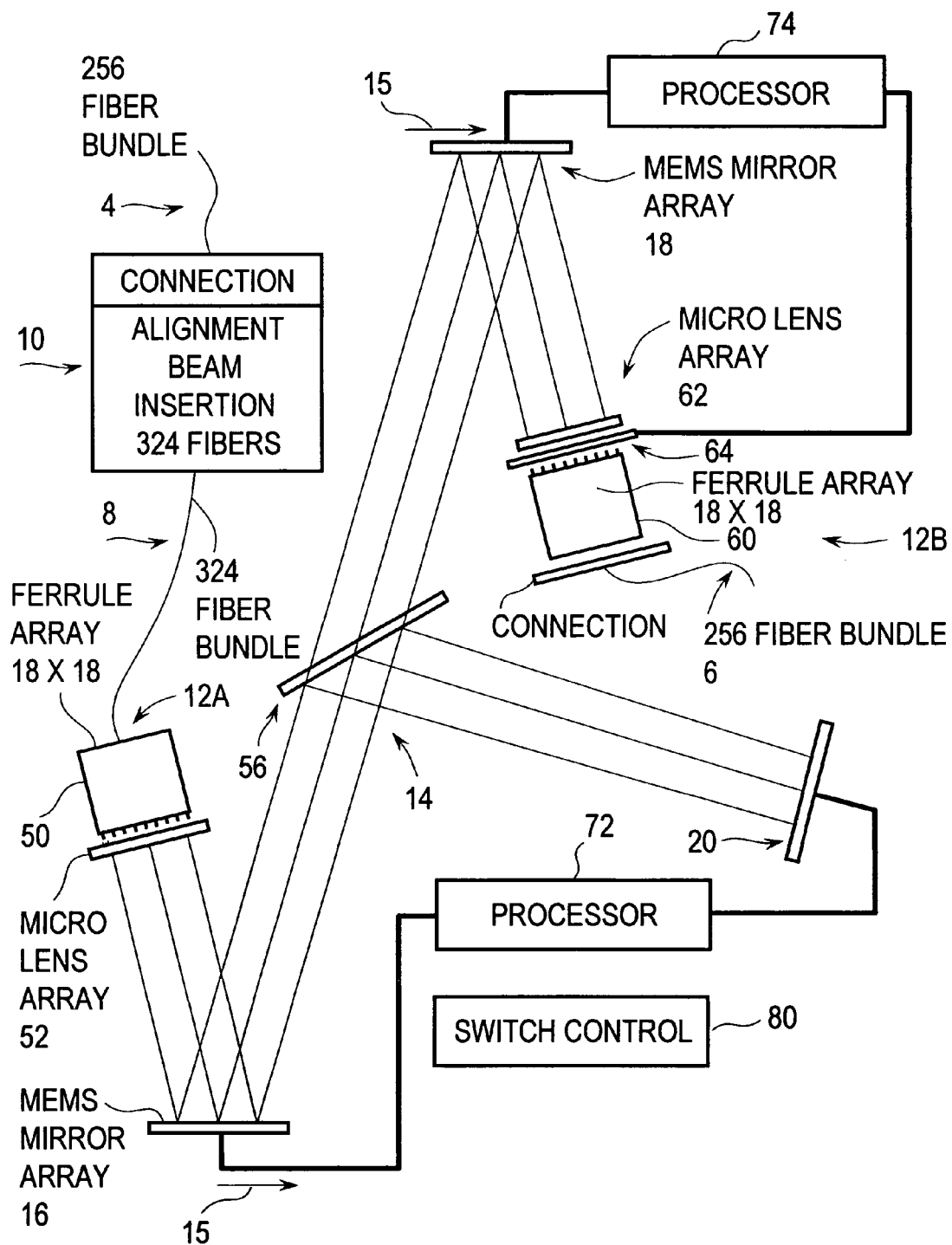
FIGS. 1A and 1B show features of a preferred embodiment of the present invention.
Figure 1B:
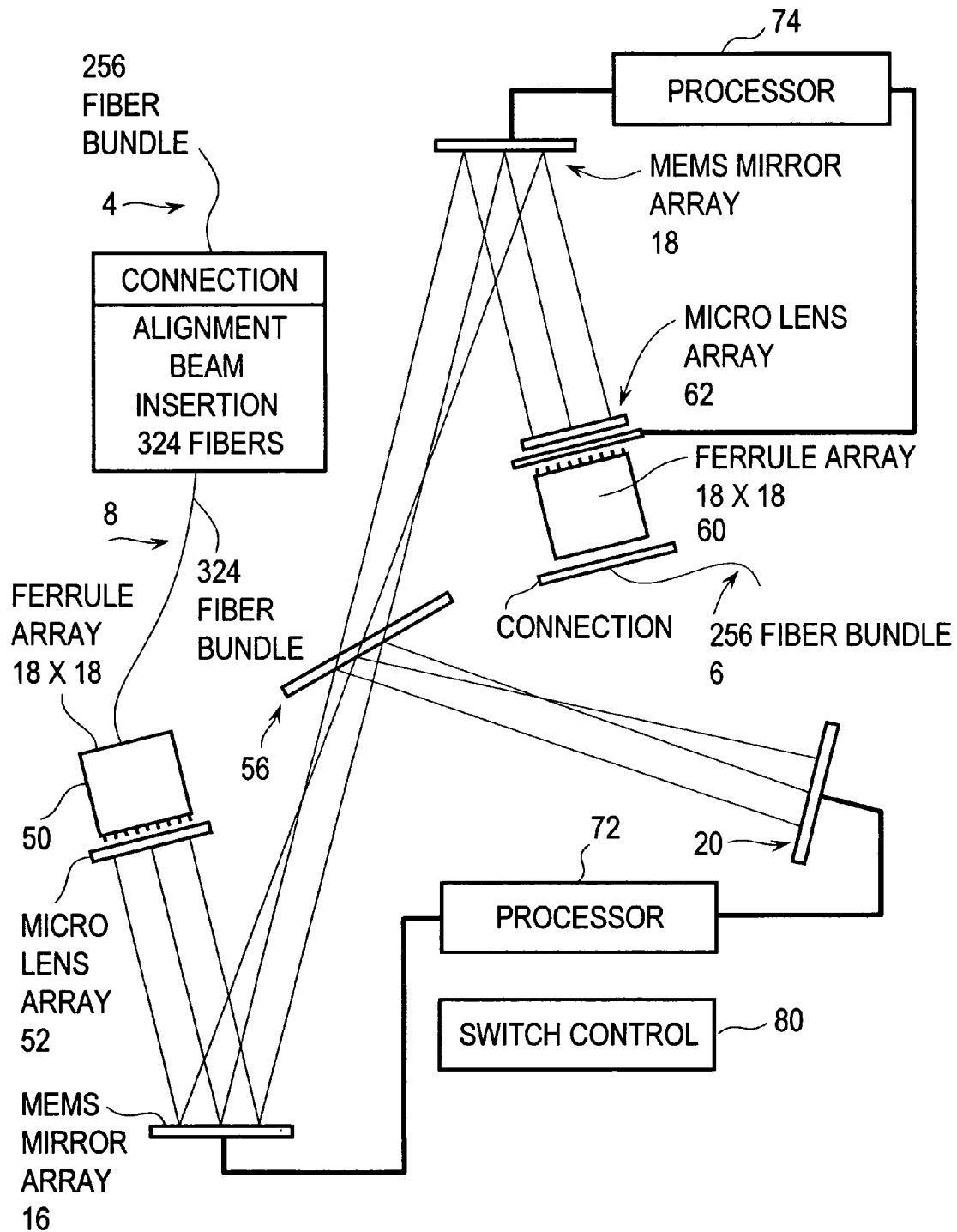

FIGS. 1A and 1B show an optical switch 2 for switching optical communication beams carried by the fibers of a first 256 (16×16) optical fiber bundle 4 into the fibers of a second 256 optical fiber bundle 6. The beams in any fiber of bundle 4 can be switched into any fiber of bundle 6. Bundles 4 and 6 may be a part of a large nation-wide communication system such as the one discussed in the section of this description entitled "Application in a Nation Scale Fiber Optic Network" in which each fiber is carrying information at a large number of separate frequencies. Or the bundles 4 and 6 may be a part of a multiplex or de-multiplex operation, such as an add-drop station, in which single or a small number of frequencies are carried by the individual fibers. The switch is divided into four basic portions: (1) an alignment beam insertion portion 10, (2) a beam input portion 12A, (3) a beam directing portion 14, and (4) a beam receiving portion 12B.

Alignment Beam Insertion Portion

Figure 2:
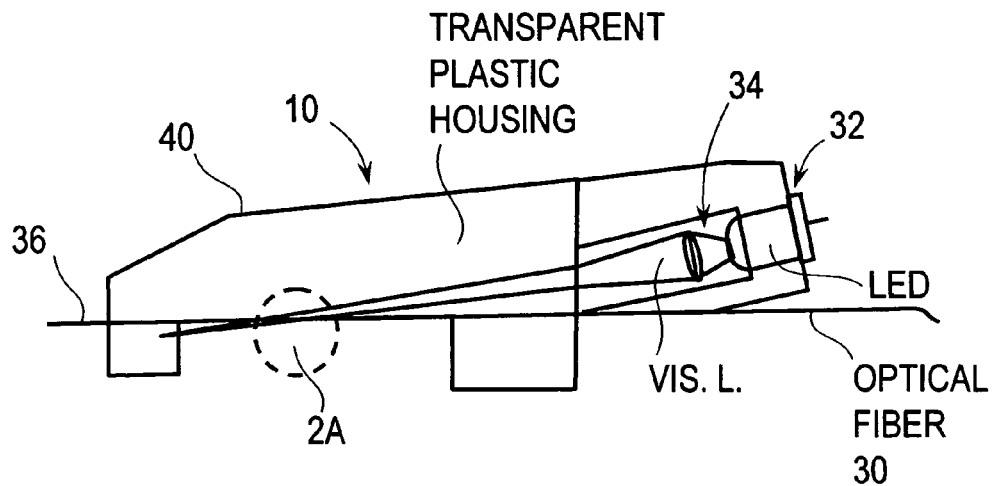
FIGS. 2 and 2A show features of an alignment beam insertion portion of the preferred embodiment.
Figure 2A:
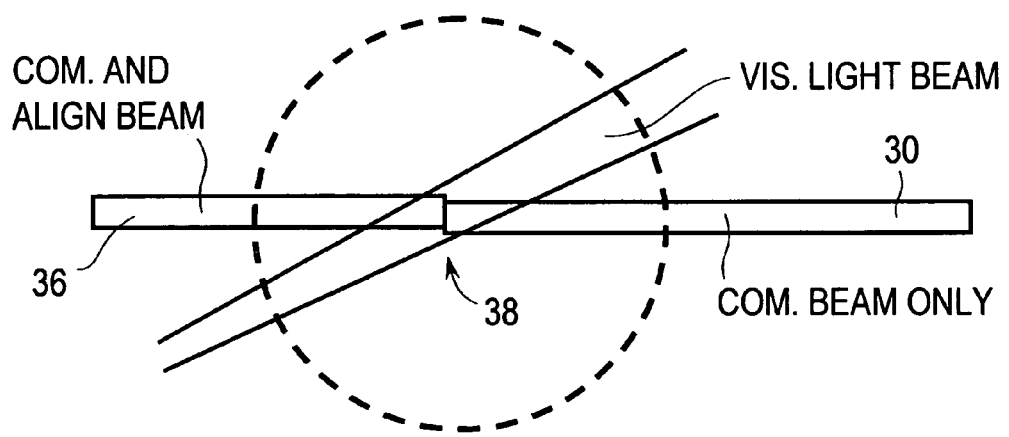

In the alignment beam insertion portion of the switch a visible light beam is added to and co-aligned with the communication beam carried by each fiber of bundle 4. This is accomplished as described by reference to FIG. 2 and 2A. Each fiber 33 of the 256 fibers in bundle 4 is connected with a connector (not shown) to one fiber 30. Fiber 30 is referred to as a communication beam only fiber. Fiber 30 is broken and re-spliced at 38 with the splice as shown in FIGS. 2 and 2A. The splice is an imperfect fusion splice as shown in FIG. 2A (showing magnified portion 2A of FIG. 2). The visible light for the alignment beams is provided by a light emitting diode 32 producing 630 nm red light. The light from diode 32 is focused by lens 34 onto the imperfect fusion splice. Fiber 30, after the splice, becomes communication and alignment beam optical fiber 36, that transmits both the communication beam and the alignment beam. This imperfect splice as shown at 38 in FIG. 2A can be done cheaply by commercial automated fusion splicing machines. And the imperfect splice can be done with precision so that just the right amount of imperfection is provided. In preferred embodiments that amount of offset is in the range of about 12 to 20 percent or roughly 1 micron. (The cores of these optical fibers have diameters of about 8 microns.) The fused fibers are held tightly against transparent housing 40 with an index matching adhesive so that focused light from diode 32 enters fiber 36 and within a short distance becomes effectively co-aligned with the communication beam from fiber 30. The approximately 12 to 20 percent imperfect fusion at 38 produces a loss in the communication beam of only about 0.2 dB (corresponding to a transmission of about 95%) Other techniques are available for injecting an alignment beam, but this novel technique is considered by Applicants to be greatly preferred because it works very well and is very inexpensive. The housing and lenses are preferably plastic and inexpensive and the light emitting diodes are inexpensive. Applicant's tests have demonstrated excellent results.

Input Portion

Figures 3A, 3B:
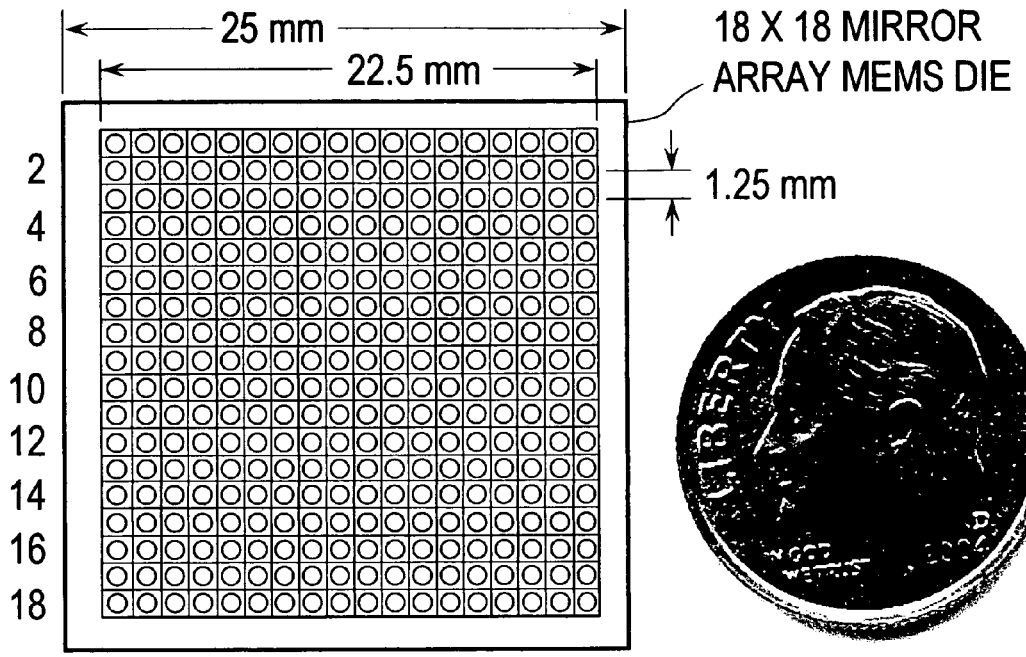
FIG. 3A shows a layout of an 18×18 array that is typical of mirror arrays, lens arrays and ferrule arrays for the preferred embodiment
FIG. 3B is a drawing of a US dime (on the scale of the FIG. 3A drawing) to indicate the array sizes.

Each communication-alignment beam is directed within optical fibers 36 forming bundle 8. The ends of each of the fibers are arranged in an input array structure and located precisely with ferrules to form ferrule array 50 as shown in FIG. 1A. The ends of each fiber are polished and define exit apertures for all of the communication-alignment beams. The fiber ends are arranged in a pattern defining an input array so that each communication-alignment beam can be identified by the location of its exit aperture in the input array structure. Such a pattern is shown in FIG. 3A. The pattern of exit apertures is an 18×18 pattern where each aperture is separated from its neighbor by 1.25 mm.

Preferably, the alignment beam insertion portion for the 256 fiber bundle provides 324 channels, with its 18×18 array, so that as many as 68 potential spare channels are provided. These switches preferably are mass produced and manufacturing defects are expected and some channels will become defective during operation either in the insertion device or downstream. When that happens, fibers can be disconnected from the fiber 30 of a bad channel and reconnected to a fiber 30 that is a part of a good channel. The same thing is done on the output side of the switch.

Figure 5:
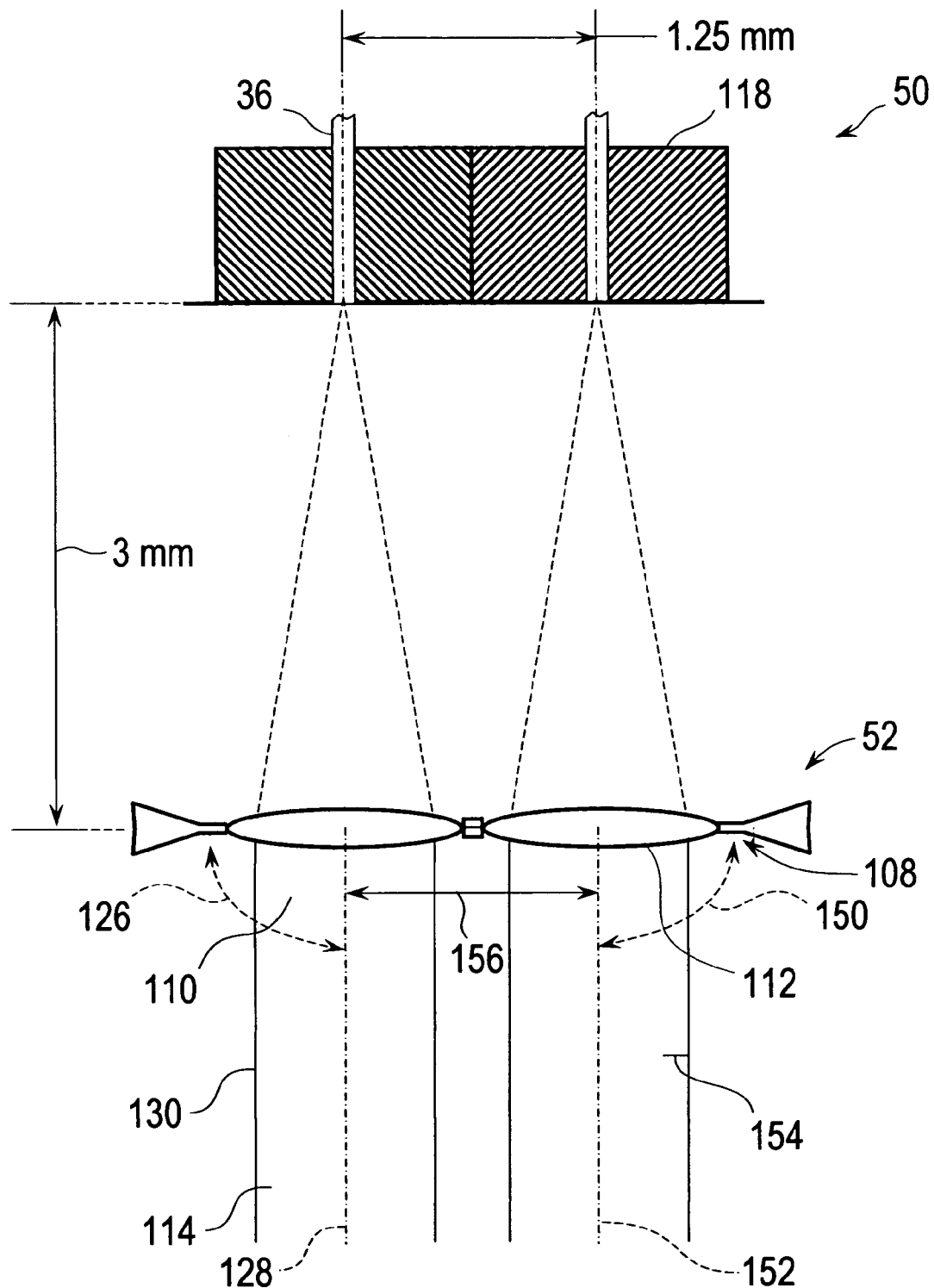
FIG. 5 shows a technique for arranging ferrules and micro-lenses in an input array structure.

An enlarged drawing of a portion of the ferrule array is shown at 50 in FIG. 5. Ferrules are shown at 118. They position fibers 36 precisely on 1.25 mm centers and align them all precisely parallel to each other. The ends 120 of optical fibers are angle polished flat. This array constitutes the input portion 12 of switch 2.

Referring now to FIG. 5, a cross-sectional view of a portion of switch 2 showing a portion of ferrule array 50 and lens array 52. The ferrule array is formed by arranging these precision ferrules 118 into a rectangular pattern as shown in FIG. 3A. Lenslet panel 108 is substantially parallel and spaced apart by about 3 mm from the ends of fibers 36, and held rigidly in place. In a preferred embodiment, lenslet panel 108 is secured to ferrule array 50 with spacers (not shown), but any other manner of maintaining the relative positions between the ferrule array and lenslet panel 108 may be used. Typical ferrules have precise dimensions which are known, and thus, the location of input fiber 36 may be determined to a very high degree of accuracy.

As discussed above, lenslet panel 108 is equipped with an array of lenslets 110 for generating cross-connection beams 114. As shown in FIG. 5, the end of input fiber 36 generates a diverging light source (shown in dashed lines). Lenslet 110 is separated from end 120 by a distance of 3 mm which, in this preferred embodiment, is approximately the focal length of the lenslet 110. Lenslet 110 receives almost all of the light from input fiber 36 and generates cross connection beams 114 that is substantially collimated, and has a diameter 130 of somewhat less than 1.25 mm. The angle between input fiber and substrate 120 contributes to the communication beam angle 126. Preferably, this angle is precisely ninety degrees with respect to lens array 108 resulting in a communication beam angle of ninety degrees and propagating along optical axis 128.

Output Portion

Figure 6A:
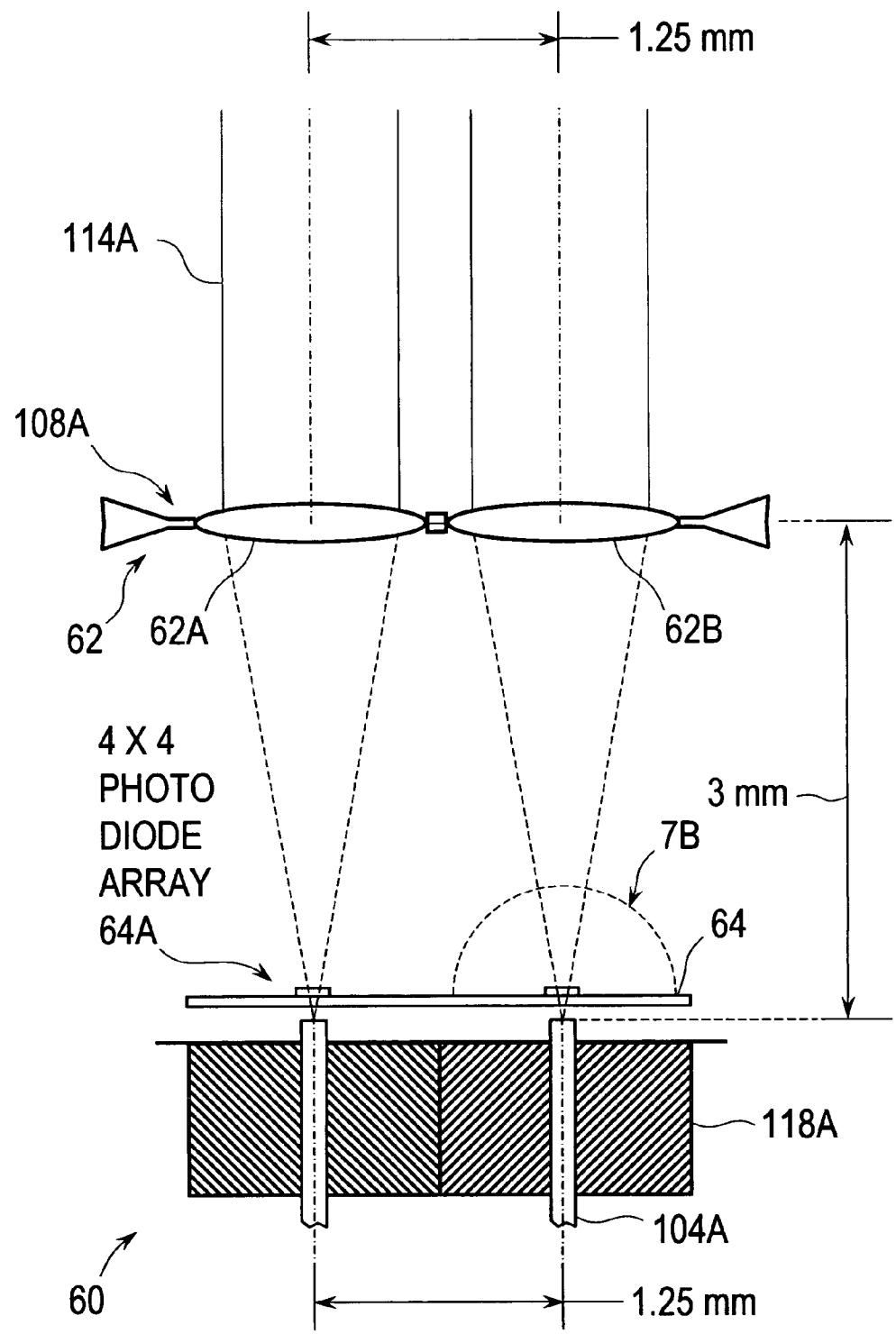
FIGS. 6A and 6B show features for focusing communication beams into the input apertures of output fibers in an output array structure.
Figure 6B:
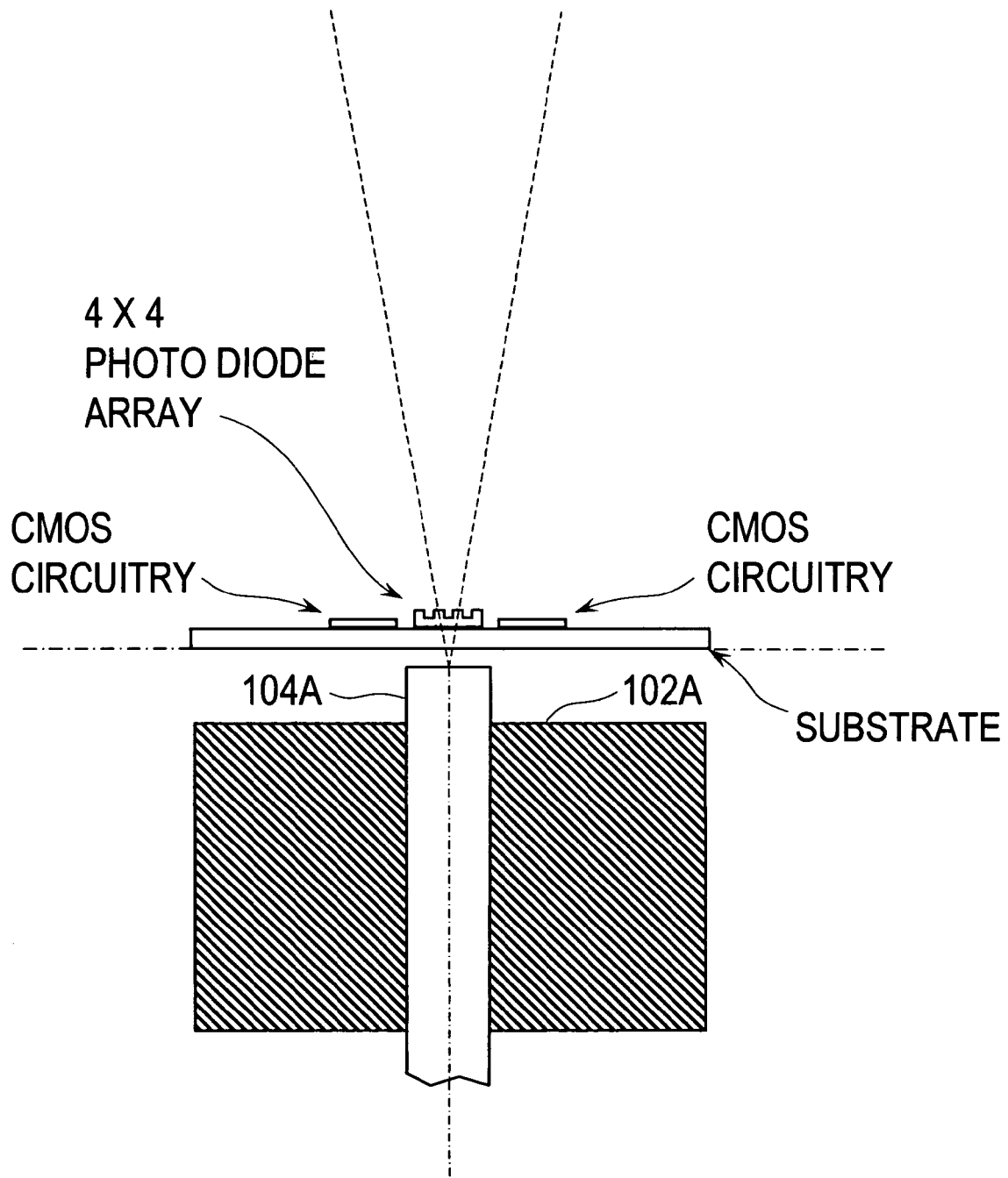

The output portion of the switch is shown at 12B in FIGS. 1A and 1B. It includes a 324-ferrule ferrule array 60 as shown in FIG. 1A and in enlarged views in FIG. 6A and 6B. The pattern of array 60 is the same as ferrule array 50 with the individual ferrules identified as shown in FIG. 3. One fiber 104A as shown in FIG. 6A is installed in each of the 324 ferrules 118A of ferrule array 60 and are a part of the switch. Each one of the 256 fibers of a 256-fiber-optic bundle are attached with a fiber optic connector (not shown) to an output end of optical fiber 104A, the other end of which is positioned within a ferrule of ferrule array 60 as shown in FIGS. 6A and 6B.

Beam Directing Portion

Figure 7:
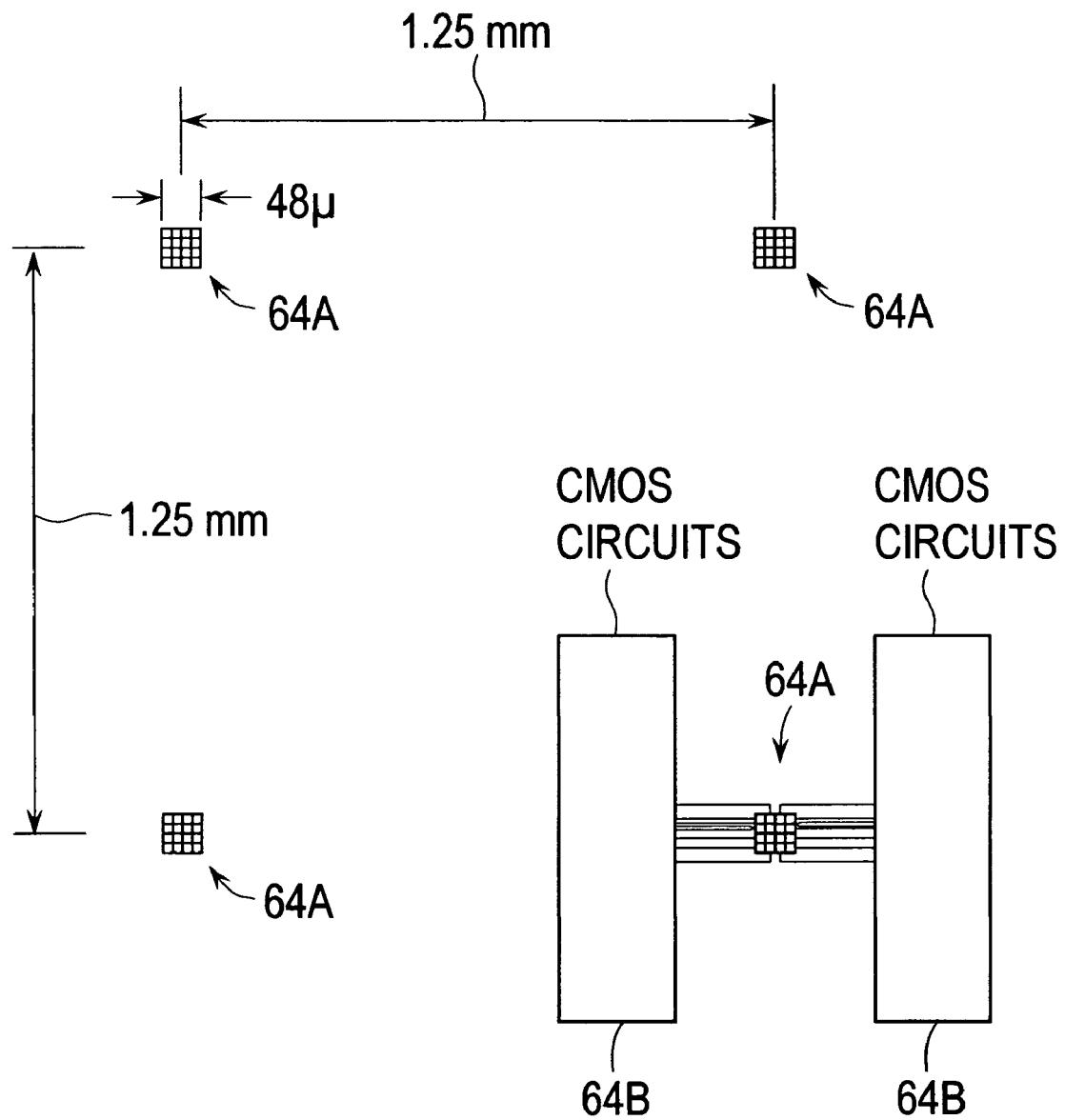
FIG. 7 shows a layout of an array of CMOS sensors.

About 3 mm optically downstream of each of the polished tips 120 of input fibers 36 in input ferrule array 50 is a micro-lens forming a part of micro-lens array 52 as shown in FIG. 5. Each of these micro lenses directs light from its corresponding input fiber onto a MEMS mirror straight ahead in MEMS mirror array 16 with its actual focus at beam splitter 56 which is positioned midway between MEMS mirror arrays 16 and 18 and at 45 degrees to the nominal beam paths between the two arrays as shown in FIG. 1A. MEMS mirror array 18 and CMOS sensor array 20 are located at the same optical distance from mirror array 16. In FIG. 1A all of the beams passing through the switch are shown as being parallel to each other in the optical section between MEMS mirror array 16 and MEMS mirror array 18 so that each beam passing through ferrule array 50 would exit at the same relative location through ferrule array 60. So (for example) beam 3F (as indicated in FIG. 3) passing through ferrule array 50 would exit through ferrule 3F in ferrule array 60. As indicated above with this switch any beam passing through ferrule array 50 could be directed by the mirrors in the two mirror arrays to the optical fiber in any ferrule in ferrule array 60. Examples of this are shown in FIG. 1B. Here (for example) the beam passing through one of the ferrules in row 1 of ferrule array 50 is directed to a ferrule in row 18 of ferrule array 60 and the beam passing through one of the ferrules in row 9 of ferrule array 50 is directed to a ferrule in row 1 of ferrule array 60. Beam splitter 50 is a dichroic mirror coated with a film so as to reflect 50 percent of the alignment beam and to pass substantially all the communication beam. CMOS detector 20 is comprised of an array of 5,184 (72×72) pixels, 16 pixels for each beam as shown at 51 in FIG. 4C. This detector sees a beam pattern substantially identical to the beam pattern on MEMS mirror array 18. Processor 72 monitors beam directions for each of the beams passing through switch 2. Data collected by CMOS sensor 20 is used by processor 72 to assure that the mirrors in array 16 are pointing each beam to the center of the correct mirror in mirror array 18. Each mirror in mirror array 18 corresponds to a particular ferrule in ferrule array 60, that is, all beams between mirror array 18 and ferrule array 60 are substantially parallel to each other. (CMOS detector 64 monitors the position of the visible light alignment beams from mirror array 18. It is transparent to the communication beams.) Each of these parallel beams is focused through a 4×4 portion 64A of CMOS detector 64 by a corresponding lens of micro-lens array 62 into the 8 micron diameter core of a corresponding optical fiber 104A of ferrule array 60 located just below the CMOS detector as shown in FIG. 6A and in enlarged form in FIG. 6B. These 4×4 photo diode arrays of detector 64 are smaller than the ones in detector array 20 as indicated by comparing FIG. 7 with FIG. 4C. In both cases however the CMOS circuitry is located out of the paths of the beams being monitored. This is especially important in the case of detector array 64 since the communication beam must pass through the array. Elements of the beam directing portion are described in more detail below.

Mirror Arrays

Figure 4A:
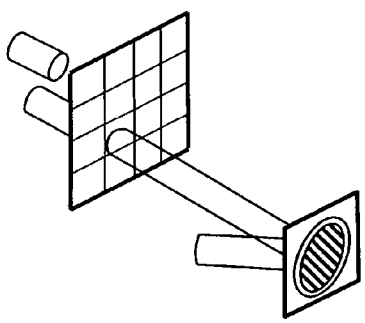
FIGS. 4A and 4B show the alignment beam is utilized to control the mirrors.
Figure 4B:
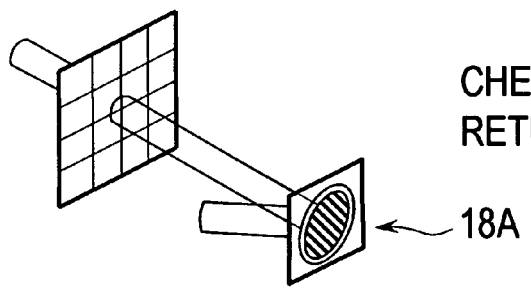
Figure 4C:
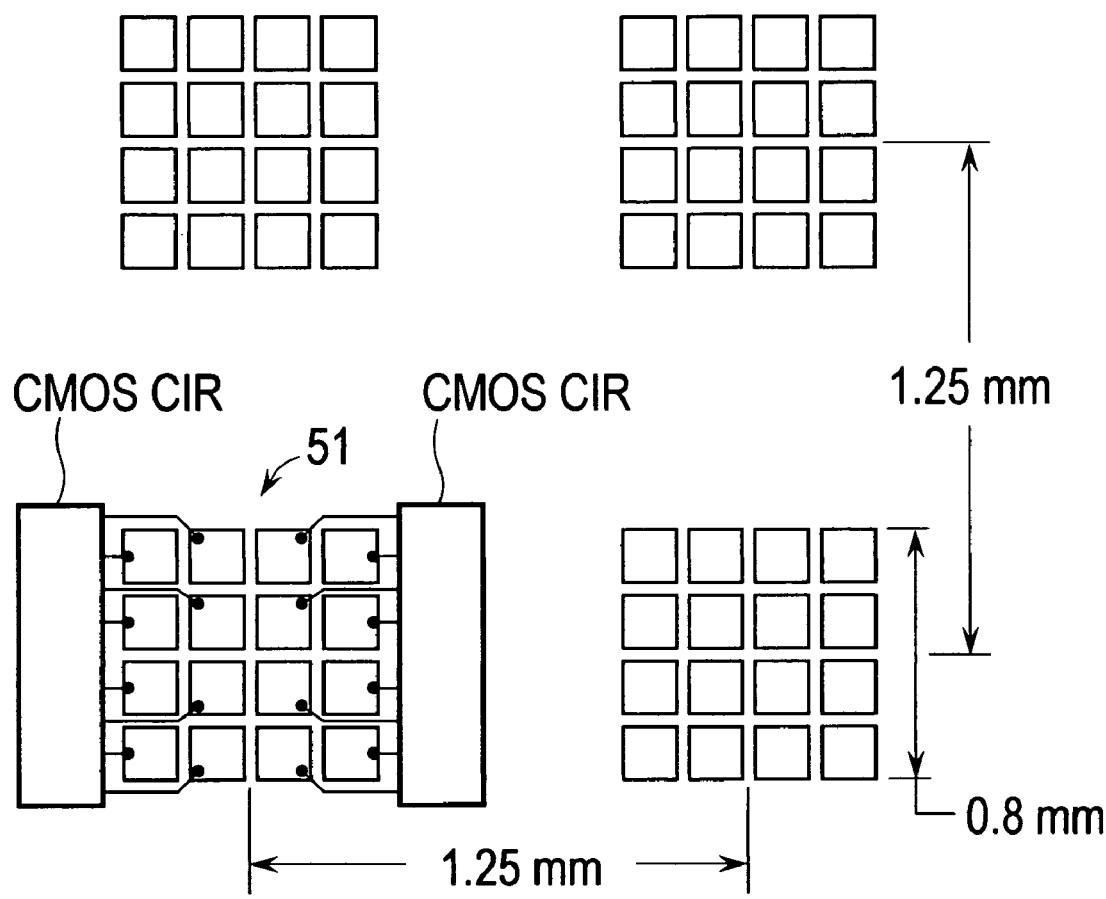
FIG. 4C shows an arrangement of CMOS detectors.
Figure 9A:
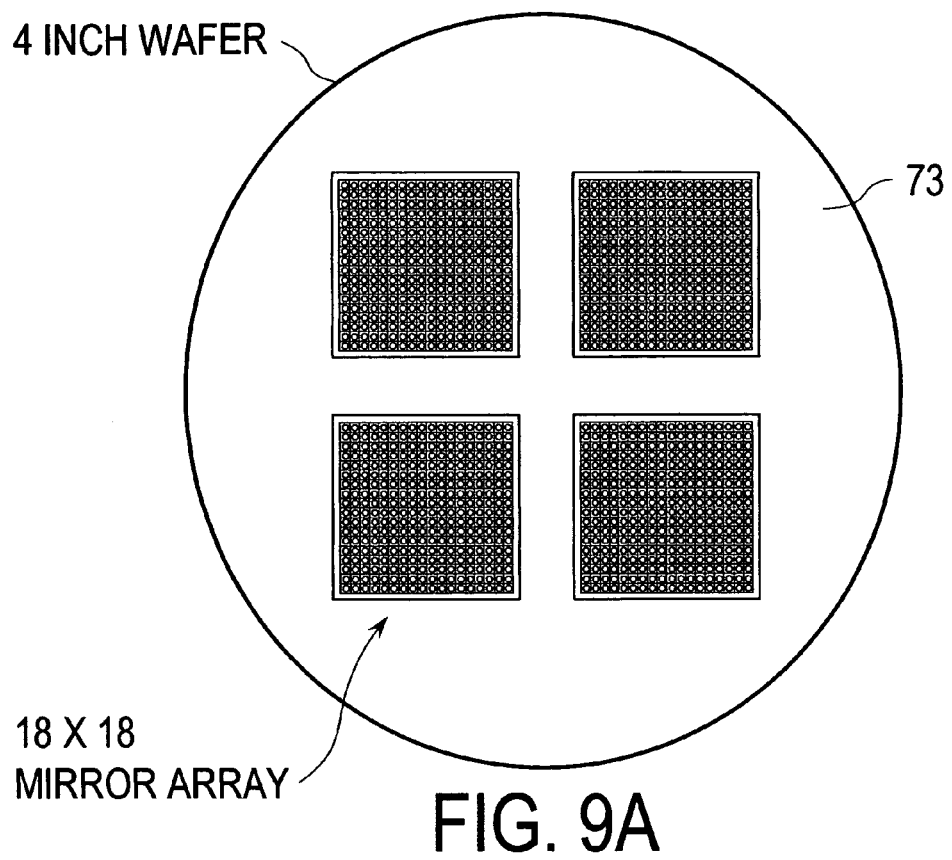
Figure 9B:
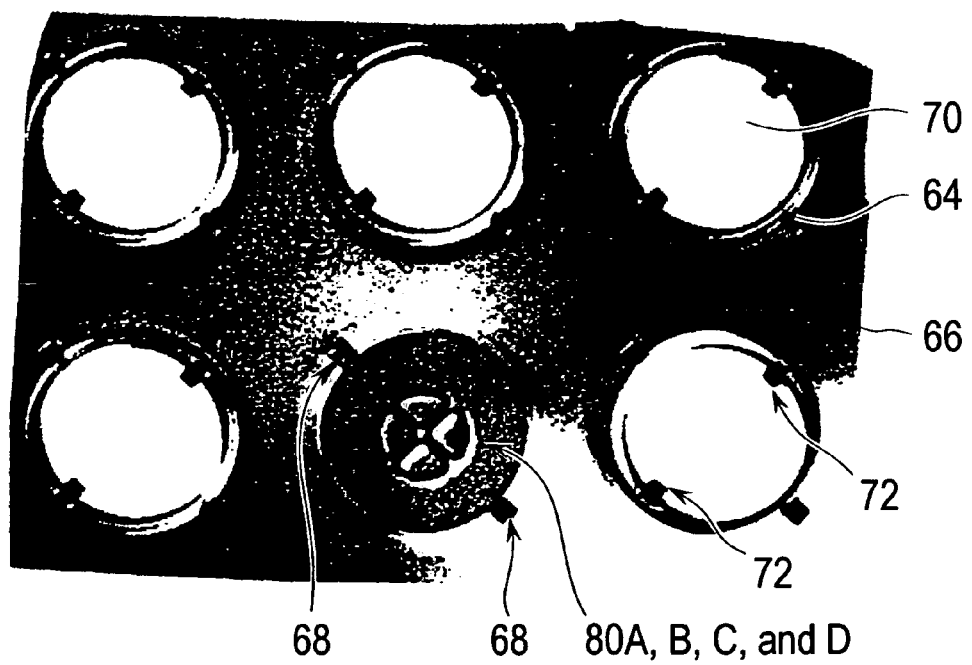
Figure 9C:
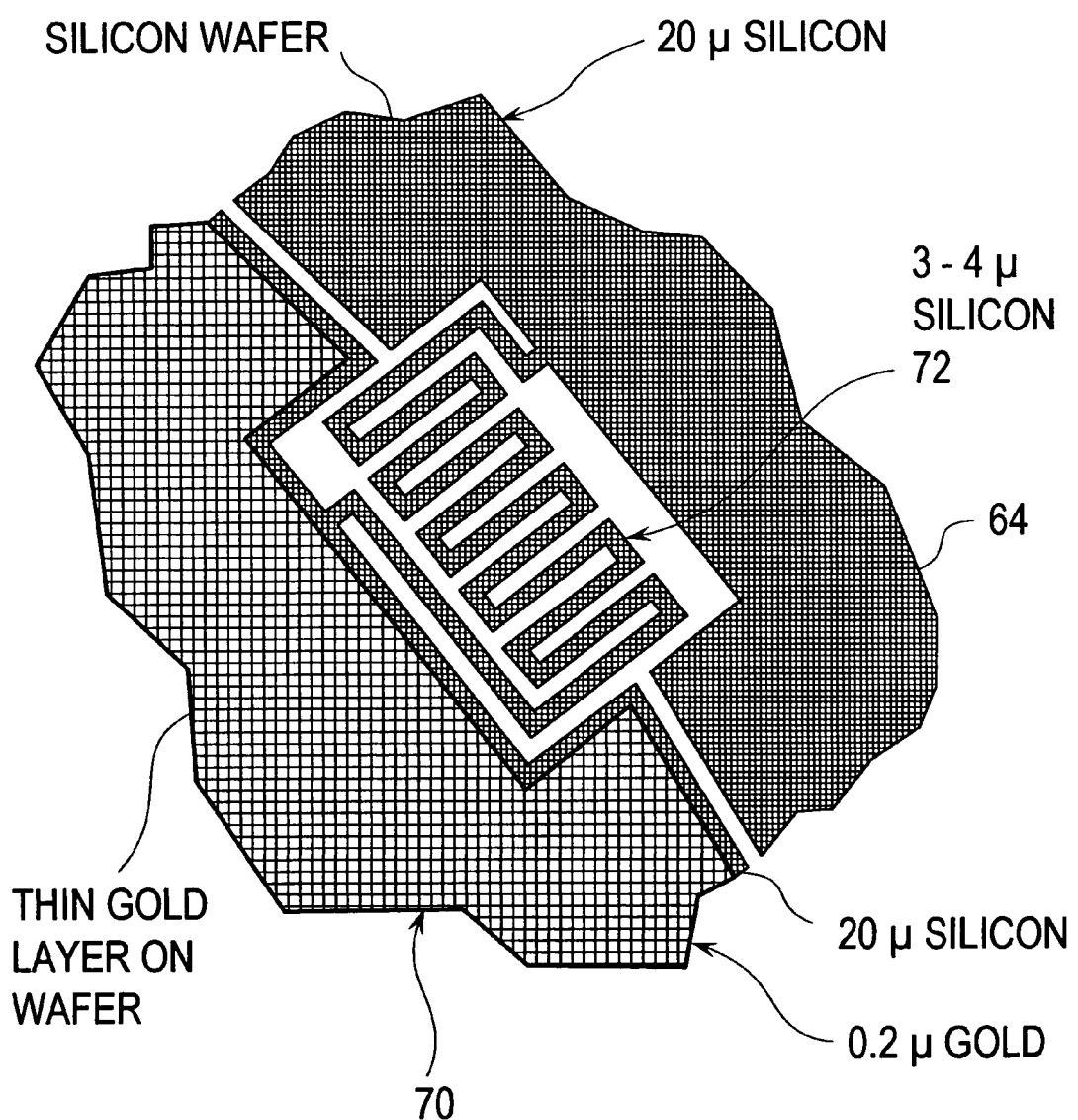

Mirror arrays 16 and 18 are described in further detail by reference to FIGS. 9A through 10K. The mirror arrays 16 and 18 are identical. Each are fabricated in two parts (1) a mirror portion 60 and (2) a mirror control portion 62, both as shown at 62 in FIG. 9D. Each of the two portions are fabricated from 4-inch silicon wafers as indicated in FIG. 9A. As described above each array contains 18×18 mirrors (324 mirrors) and is about 1 square inch. FIG. 9B shows an enlarged view of 6 mirrors of the array. The mirror reflective surface is substantially circular as shown in FIG. 9B with diameters of 0.790 mm as shown in FIG. 9D. The mirrors are spaced apart from each other on 1.25 mm centers in the direction perpendicular to the plane of FIG. 1A. In the direction 15 shown in FIG. 1 the mirrors are on 1.29 mm centers to account for the angle made by the cross connection beams from lens array 52. The central portion 70 of each mirror comprises a mirror substrate and a reflective surface. The mirror substrate is a 20 micron thick silicon substrate and the reflective surface is provided by a 0.02 micron gold layer deposited on the silicon substrate as indicated in FIG. 9D. A ring element 64, also 20 microns thick, circles the central portion 70 of each mirror, and ring element 64 is hinged to the mirror structure 66, about 80 microns thick, at two places diametrically opposite each other as shown at 68 in FIG. 9B. The central portion 70 of the mirror, the mirror element, is hinged to ring element 64 at two locations 72 also diametrically opposite each other and 90 degrees offset from the hinges hinging ring section 64 to mirror structure 66. The hinges are each fabricated from the silicon wafer using a lithography process at the same time the rest of part 60 is fabricated. A magnified drawing of one of the hinges 72 is shown in FIG. 9C. It hinges the mirror element 70 to ring element 64. The hinges are of a snake-like shape with a thickness of about 3–4 microns. As indicated in FIG. 9E the mirror element 70 can be tilted up to about 10 degrees. Tilting of the mirror is accomplished with four electrodes that apply electrostatic forces when charged to potentials up to about 300 volts. The four electrodes 80 A, B, C and D are shown in FIG. 9B in one of the six mirrors where the mirror element 70 has been removed to show the electrodes underneath. FIG. 9E shows an example of the tilting of mirror element 70 a few degrees using electrode 80A at about 170 V and electrode 80C at about 130 V. FIGS. 4A and 4B loosely describe the Applicant's mirror control technique. FIG. 4A shows a mirror misaligned with the misalignment being detected by a 16 pixel CMOS sensor array. Signals from the sensor array are fed to processor 72 or 74 and the processor determines the voltages that need to be applied to electrodes 80 A, B, C and D to correct the alignment. The mirror is correctly aligned as shown in FIG. 4B. (The reader should note that FIGS. 4A and B are not exact representations of either of the mirror controls for the FIG. 1A embodiment. For example, sensor array 20 is out of the path of the communication beam and sensor array 64 sees a beam that is almost at focus.) As indicated above the mirror controls may be operated open loop where mirror positions are based on stored calibration data. Processors 72 can be programmed to update calibrations as often as desired. This can be done automatically by sending a standard communication signal through the switch and monitoring its intensity coming out of the switch as mirror positions are changed or dithered.

Fabrication of Mirror Controls

Figure 10A:
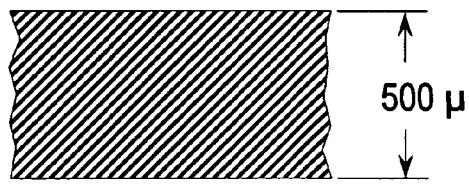
Figure 10B:
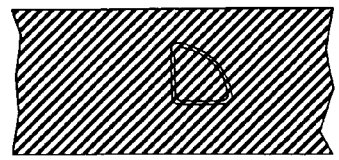
Figure 10B:
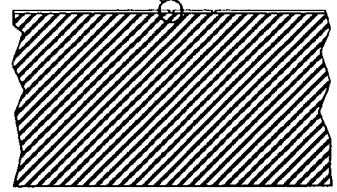
Figure 10C:
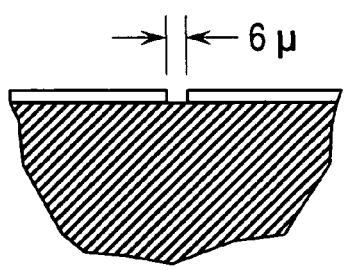
Figure 10D:
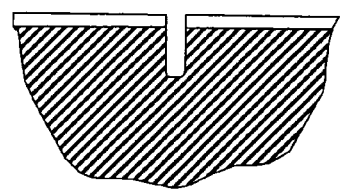
Figure 10E:
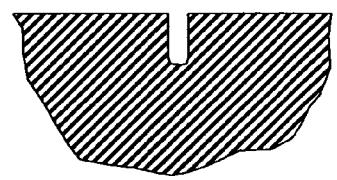
Figure 10F:
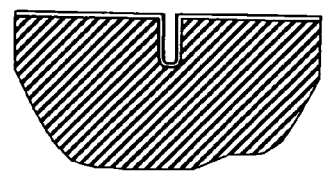
Figure 10G:
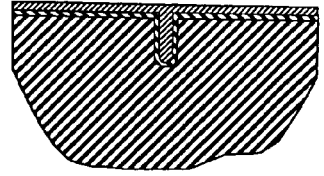
Figure 10H:
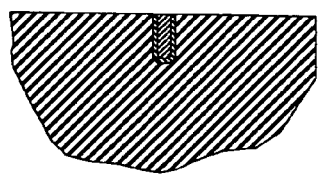

FIGS. 10A through 10K show a preferred technique for fabrication of mirror controls for the mirrors of mirror arrays 16 and 18. Wafer 73 is doped to prove an electric conductivity of about 0.01 ohm-m. These controls are fabricated from a 4-inch 500 micron thick silicon wafer as indicated in FIG. 10A. FIG 10B shows the printing of the shape of one electrode such as 80A on a layer of photo-resist. A blow-up of a cross section of the pattern is shown in FIG. 10C and that pattern is etched into the silicon as shown in FIG. 10D. The photo-resist is removed and a silicon oxide insulating layer is produced on the surface as shown in FIG. 10F, insulating silicon dioxide is deposited in the slot and the surface is then polished down as shown in FIGS. 10G and H. The wafer is then thinned down to about 100 micron and a trench is etched in the bottom surface of the wafer opposite the top trench until the two trenches meet as shown in FIGS. 10I and J. The bottom trench could be filled with insulating material or left open. A metal contact 81A is then deposited on the bottom of electrode 80A as shown in FIG. 10K. A signal control conductor is then soldered to contact 81A as shown in FIG. 9E.

Calibration

Preferably a calibration procedure is carried out for each cross connect switch so that processors 72 and 74 can be programmed to properly direct the beams through the switch when switching procedures are called for. A preferred process for performing the calibration is described below. Preferably switch control 80 and processors 72 and 74 as shown in FIG. 1A are programmed to perform the calibration automatically.

1) All mirrors in mirror array 16 are adjusted one-at-a-time utilizing sensor 20 to assure that the beam from each mirror in array 16 is pointing its beam to its corresponding mirror in mirror array 18. This in the configuration shown in FIG. 1A.
2) Each mirror in mirror array 18 is adjusted using sensor 64 to assure that each beam from each mirror in mirror array 18 is pointing its beam to its corresponding lens in lens array 62.
3) Each mirror in mirror array 18 may now be dithered while monitoring beam position at sensor 64 and/or the intensity of a standard communication beam at the output of the switch to assure that its optimum position based on sensor 20 data is recorded in the memory of processor 72.
4) Each mirror in mirror array 16 may now be dithered to assure that its optimum position is recorded. If the optimum position changes for any mirror in array 16, Step 3 should be repeated for the corresponding mirror in array 18. If its position changes another test of the mirror in array 16 may be desired.

5) Each mirror in mirror array 16 (for example mirror 1A is now directed sequentially to all the 324 mirrors (mirrors 1A through 18R) in mirror array 18 one-at-a-time using sensor 20 to determine the proper positions of the array 16 mirror (e.g., mirror 1A). All of the mirrors in array 18 are adjusted utilizing sensor 64 to determine the proper position of all of the mirrors (i.e., mirrors 1A through 18R) in array 18 to direct the beam from ferrule 1A in input ferrule 50 to each of the 324 ferrules in ferrule array 60. For mirror 1A in array 16 and each of the 324 mirrors in array 18, the positions of the mirrors for connections of input fiber 1A to the 324 output fibers 1A through 18R the positions of the mirrors for best communication are recorded in the memories of processors 72 and 74.

6) Step 5 is then repeated for each of the mirrors in mirror array 16.

7) Processors 72 and 74 (based on the collected data from sensors 20 and 64) develop and store look-up values for mirror positions for each of the 324×324 (104,976) possible connections using this switch.

When a switching operation is needed, communication is temporally halted in the affected fiber optic and the mirrors are adjusted through processors 72 and 74 as directed from a switch control processor 80 shown in FIG. 1A to carry out the switch. The time for this operation is about 10 milliseconds. During operation of the switch a closed loop arrangement may be implemented in which sensors 64 and 20 continually or periodically monitor alignment beam position and, based on signals from the sensors, processors 72 and 74 provide signals to keep the mirror controls of mirrors of arrays 16 and 18 in their optimum position. The switch is also preferably provided with a control function that permits all alignment beams except one to be turned off during operation so that continuity checks can be made for each connection without any possibility of mix-up.

Application in a Nation Scale Fiber Optic Network

U.S. patent application Ser. No. 10/677,590 that has been incorporated herein by reference describes a nation-scale high speed communication network that utilizes all optical switches. The switches described herein would work very well in a network like the ones described in that application. In the preferred embodiment described in the '590 application, the center wavelength of the beams in each fibers is about 1.57 micron (corresponding to 193.1 THz) with a usable bandwidth of 15,000 GHz (between 186,000 GHz to 201,000 GHz). As many as 300 separate communication channels (at 50 GHz each) may be carried in the beam in each fiber. Each of the 300 separate channels (at 50 GHz each) can be divided up into still smaller frequency ranges such as six sub-frequency ranges with 4 GHz spacings. This would permit 1200 signals to be transmitted simultaneously in each fiber, so with 256 fibers per bundle, we could theoretically transmit more than 300,000 separate signals simultaneously per fiber bundle. These signals must be inputted separately at transmit locations to produce the combined beams and separated out from all other signals to be received by each signal recipient. This is referred to as frequency division multiplexing Time division multiplexing permits additional multiplication of the number of separate communications that can be handled during any particular time period.

Figure 11:
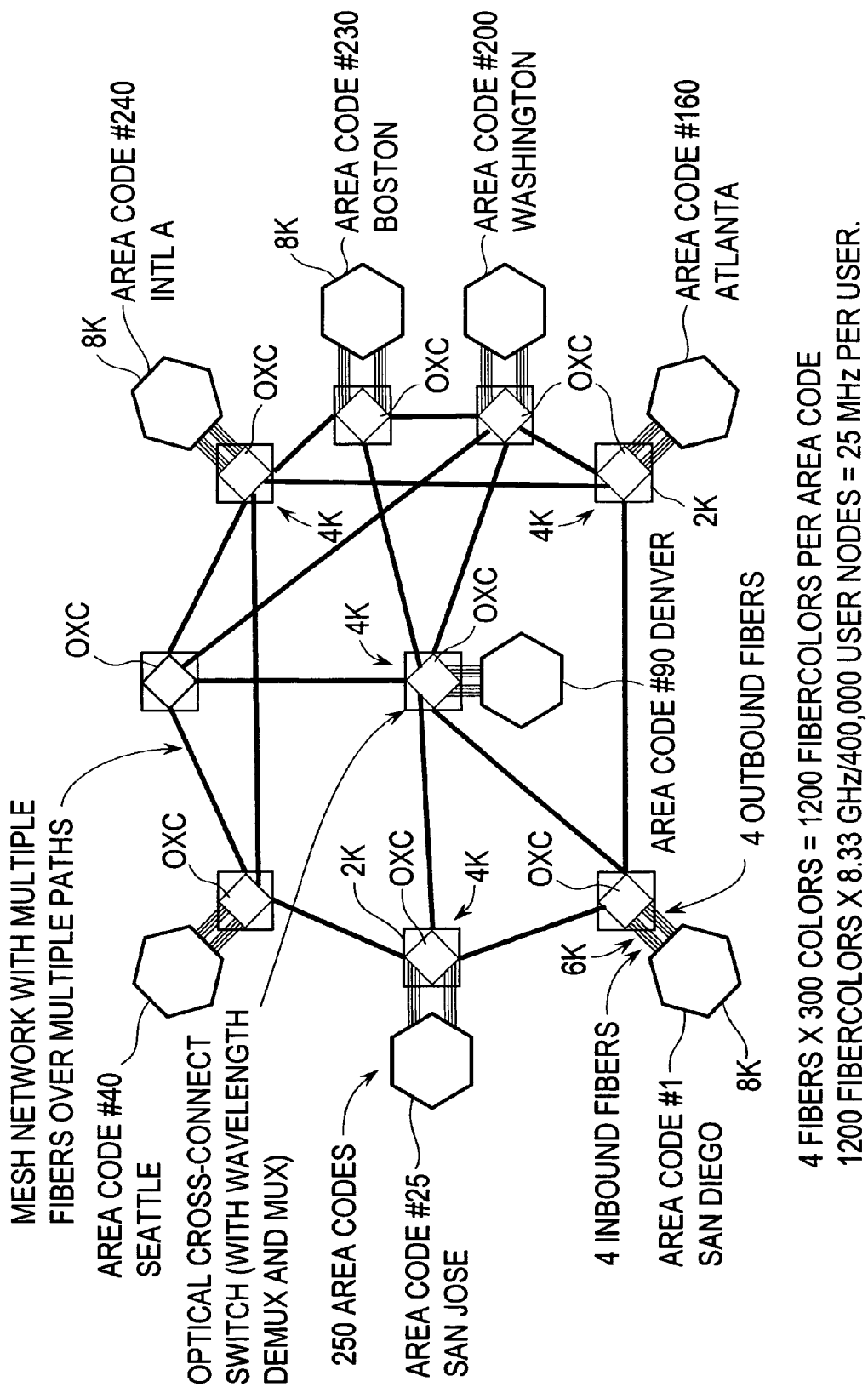
FIG. 11 is a modified version of FIG. 1 from parent application Ser. No. 10/677,590.

FIG. 11 is a modified version of FIG. 1 from the '590 patent application. Here we consider a nation-scale network with end users assigned to one of 250 area codes with roughly equal numbers of end users in each. For instance, area code #1 has been assigned to San Diego, #40 to Seattle, #200 to Washington D.C., and #240 to some subset of international users. The proposed network can have about 400,000 User Nodes per Area Code. As seen in FIG. 1, optical cross-connect switches 2K associated with each area code are located at mesh nodes 4K tied together in a mesh network which allows switching of optical signals from any particular area code to any other area code. The particular mesh network would make maximum use of intercity fiber trunk lines which have already been installed.

In this preferred embodiment all long haul communication is through optical fibers operating in the wavelength range centered at about 1.57 micron (corresponding to about 193.1 THz). The network is designed to operate at frequencies between 186 THz to 201 THz for a total bandwidth of 15,000 GHz. At 50 GHz spacings, this provides 300 "color" channels per optical fiber. Four separate fibers provide a total of 1200 communication channels.

There are in this embodiment 1200 separate wideband communications channels (each with 15 GHz of useable optical bandwidth) leaving and entering each area code. We call these wideband channels FiberColors, and they are distributed as 300 different DWDM wavelengths (standard 50 GHz spacing) on 4 separate fibers. The preferred optical network operates in the C and L bands at a center frequency at 1570 nm (193.1 THz). Thus there are eight lit fibers between an Area Code and its corresponding switch, four for outgoing traffic and four for incoming traffic as shown at 6K on FIG. 11.

If we divide 1200 FiberColors by the number of area codes (300) we have an average of 4.8 FiberColors per area code. However, the 1200 outgoing FiberColors from any particular area code (say San Diego) are allocated based on usage demand to the 250 area codes with a total bandwidth of ~15 THz per fiber. For instance, the FiberColors for traffic from San Diego might be allocated at a particular time as follows: ten for traffic to Washington, six for traffic to Seattle, one for traffic to Atlanta, etc., until all 1200 FiberColors are accounted for. It is expected that the actual allocation will be automatically adjusted periodically as demand shifts with time of day and day of the week. Therefore, at any particular time, the switches must be configured so that each FiberColor from each origination area code is guided through the network to its destination area code without interference. (That is, the same fiber cannot be used simultaneously for two FiberColors operating at the same wavelength). It was not immediately obvious that this could be done, but applicants have developed an algorithm for accomplishing this task which appears to be robust and to converge in a practically short time. We call this algorithm a Magic Square Algorithm, because the underlying matrices of FiberColors which need to be allocated have rows and columns which add up to the same number. This problem of allocating FiberColors along with its solution is discussed in detail in the section of this specification entitled "Magic Square Software." The solution of this problem is a key technical innovation, as it enables the deployment of a nation-scale all-optical network with a relatively small number of channels without the disadvantages of having to convert any optical signal to an electrical signal or to another DWDM wavelength between the data source and the data destination area codes.

Operation of the switches 2K at the Mesh Nodes 4K is discussed in more detail in the '509 patent application." In preferred embodiments, all DWDM wavelengths are de-multiplexed before optical switching, and then re-multiplexed after switching. No wavelength separation is required at a resolution finer than the standard 50 GHz DWDM spacing, so that standard components can be used. (Finer channel resolution only occurs within the source and destination area codes). Customized switches which combine wavelength separation with the optical switching may also be possible. Optical Amplifiers (such as erbium doped fiber amplifiers) are used throughout the network as necessary to maintain appropriate optical signal strength.

Other Sizes

In the present embodiment, the configuration is an 18×18 array designed to be used to connect 16×16 fiber optic bundles. However, readers should appreciate that the present invention may be scaled to many other sizes, smaller or larger, without any significant increase in complexity of the manufacturing, alignment, or corresponding control system. Also additional or fewer spare channels may be provided based on experience.

Preferred Control Technique

Figure 8:
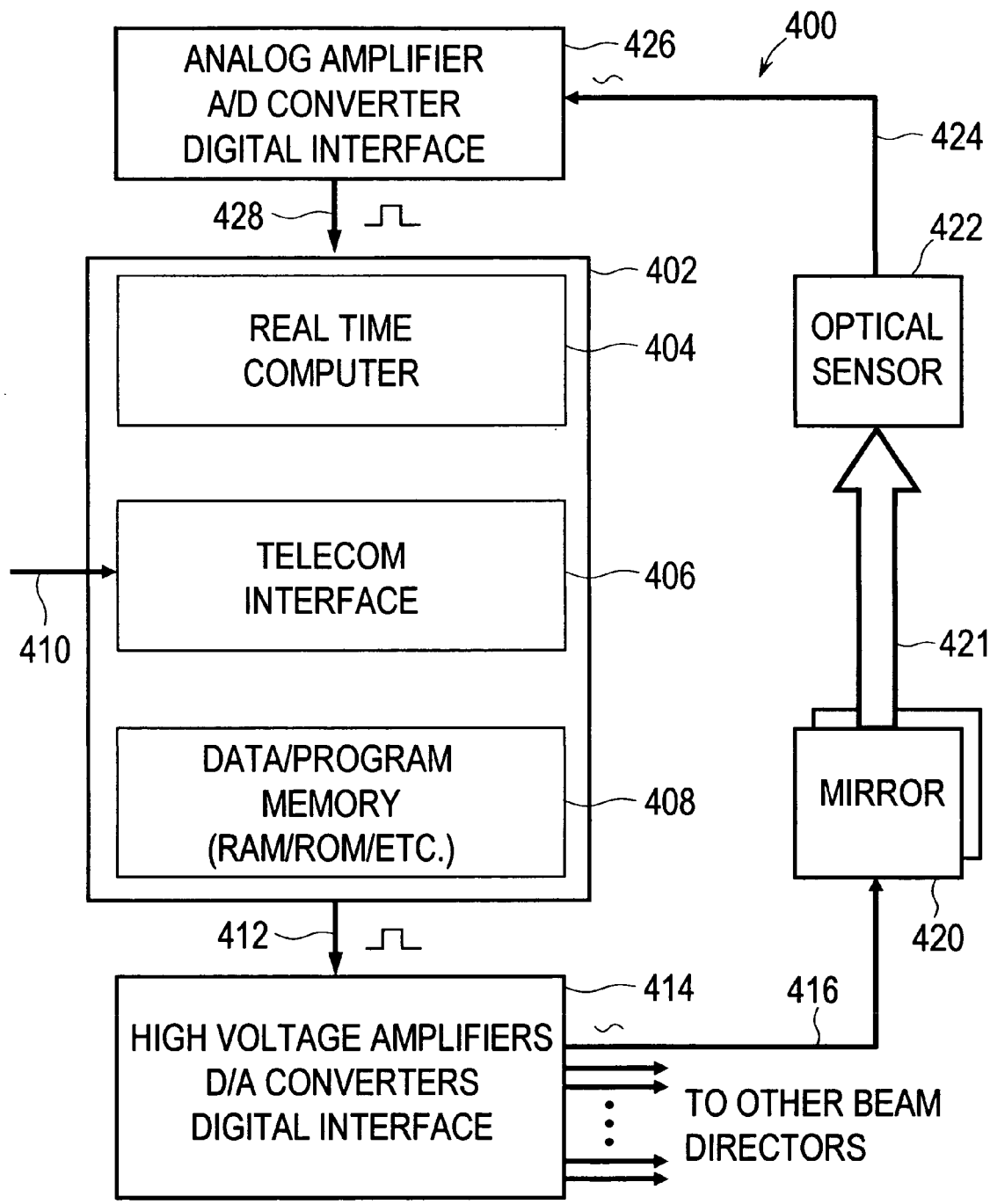
FIG. 8 is a block diagram of a control program for an optical cross connect switch.

Referring now to FIG. 8, a block diagram of the control system of the Optical Cross Connect Switch of the present invention is shown and generally designated 400. Control system 400 includes a computer 402 containing a real time computer 404, a telecommunications interface 406, and a digital storage device 408. Computer 402 is a system capable of making the computations required to implement a closed-loop feedback control system. It may be comprised of analog or digital electronics, or may be implemented with optical computations units. In a preferred embodiment, the computer consists of digital electronics with at least one component capable of computation, and with at least three digital interfaces. The first interface would be capable of receiving the digitized optical feedback signals, the second interface would be capable of transmitting command signals to the analog electronic driver required for actuation of beam directors 16 and 18. And the third interface would be capable of receiving the network configuration command from an external source and transmitting the state of the optical switch. Other interfaces may be required for certain implementations.

In a preferred embodiment, the digital computation electronics could consist of one or more general purpose processors, such as a commercial available digital signal processor or other central processing unit, or might be on e or more application specific integrated circuits design specifically for this task. The digital interfaces could consist of any one of a large variety of parallel or serial links and may conform to some industry standards, or may be custom for a particular implementation.

Telecommunication interface 406 provides an electronic interface between computer 402 and a telecommunication exchange via interconnect 410. In a typical environment incorporating the Optical Cross Connect System of the present invention, interconnect 410 will receive switching information, including the input fibers and the output fibers, which are to be optically coupled. A standard format for receiving this information may be established by a particular telecommunications network, but it is to be appreciated that regardless of the particular protocol, this information will contain particular switch configurations which may be implemented by the present invention.

Digital storage device 408 may include both temporary and permanent digital memory media. For example, digital storage device 408 may include random access memory for manipulation of data, and programmable read only memory for storage of programmed computer sequence steps, and may include tables of offset values.

Computer 402 is electrically connected to digital interface 414 via electrical connection 412. Digital interface 414 contains high voltage amplifiers, and digital to analog converters that convert digital information from computer 402 to the analog signals necessary to control the mirror elements. Digital interface 414 also transmits and receives any necessary digital data between computer 402 and beam directors 420. (The reader should not that for simplicity FIG. 8 shows only one mirror and one sensor and should recognize that each cross connection beam is controlled by the positioning of two mirrors and beam directions are monitored by two sensors. However, a preferred technique for maintaining beam position is to adjust only one mirror at a time. It will often be necessary to tweak one mirror in a beam path then tweak the other one several times before perfect control is established. This can all be programmed to occur automatically or as directed by an outside control device or operator.

The pivot controls for a single MEMS mirror receive the electronic signals from interface 414 and drive the MEMS mirror its two particular rotational positions in order to direct cross-connect beam in its desired directions. In order to ensure that the MEMS mirrors are properly positioned, the optical sensors measure the position of the alignment beam and provide optical feedback as described above. Analog interface 426 contains analog signal conditioning components, including analog amplifiers and analog to digital converters, which receive the analog signals from optical sensor 422 and generate digital signals for transmission along electrical connection 428 to computer 402. Computer 402 receives the electronic information from sensor 422 regarding the position of the alignment beam, and compares this position to the position contained in the memory 408 to determine whether the beam director elements 420 in beam directors 16 and 18 are properly positioned. If there is a difference between the position of the alignment beam measured by sensor 422 and the position data contained in memory 408, computer 402 adjusts the electronic signals sent to digital interface 414 to modify the rotational position of beam director elements 420 and reposition the alignment beam within the sensor. The position of the alignment beam is then once again measured by optical sensor 422, and the adjustment to the rotational positions of the beam directing elements is repeated if necessary. By properly positioning the alignment beam in this manner, the proper position of the communication beam is achieved without any interference with or measurement of the communication beam itself.

Operation of the Invention

In operation, the Optical Cross Connect Switch of the present invention transmits an optical signal from an input fiber in bundle 4 to an output fiber in bundle 6. The operation of a preferred embodiment of the present invention is perhaps best understood with reference to FIGS. 1A and 1B.

Reconfiguration of the input-output mapping of fibers, the switch fabric, is accomplished as follows. Upon receipt of a reconfiguration command, the beam steering mirrors of the affected channels immediately perform an open loop step, moving from their current position to a new position appropriate for completing the commanded reconfiguration. During the open loop step, control feedback is terminated on the affected channels. When the beam steering element are near their new positions, the alignment beam falls on the portion of the sensor correspond to the new output fiber indicated by the configuration command. At this point, closed loop servo control is re-initiated and the new connection is finalized. During the open loop step, the alignment beam for all the other repositioning channels may be switched off in order to eliminate any contamination of the servo feedback signal of non-switched channels by the guidance beams of the switching channels.

In a preferred embodiment, the servo loop may operate only on the mirror elements in the second mirror array. In alternative embodiments, the servo loop may operate on the mirror elements in the first mirror array, the second mirror array, or both the first and second mirror arrays. In one embodiment, the calibration of each of the mirror elements in the first array is sufficiently accurate that it is possible to position these elements with an open loop signal such that substantially all of the optical energy of the alignment and communications beams corresponding to each element will fall on the intended target mirror element in the second beam director array. The open loop pointing of the beam directing mirror elements is calibrated at manufacture, and periodically throughout the lifetime of the device, insuring that the open loop pointing accuracy is high. Also, the open loop pointing accuracy of the mirrors in the first array needs to be no better than a few percent of the full stroke since small errors in position of the first elements are, in effect compensated by the closed loop servo control system operating on elements in the second mirror array. This initial open loop pointing, in combination of the feedback control of the second beam directing elements accurately positions the communication beam onto the center of the output fiber.

Multiplexing and De-Multiplexing

An important application of the switch described above is as a part of a frequency multiplexing or de-multiplexing operations. As explained above multiplexing typically involves adding signals at specific frequencies to a trunk line optical fiber carrying other frequencies and de-multiplexing is the opposite. In each case switches are needed to direct the resulting optical signals into the desired direction, typically separate optical fibers. Several multiplexing and de-multiplexing techniques are available as discussed in the background section including the use of thin film filters. However, Applicants preferred multiplexing/de-multiplexing technique is one that they have developed that provides substantial advantages over prior art techniques. This technique utilizes porous silicon optical filters. This technique produces results very similar to thin film filters, but the porous silicon filters can be produced much quicker and with much less expense. A short summary description of these porous silicon optical filters is provides below and pictured in FIGS. 12A and 12B.

Porous Silicon Optical Filters

Figure 12A:
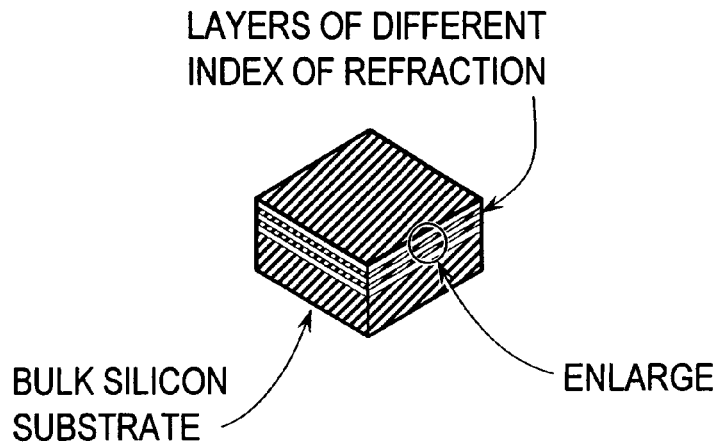
FIGS. 12A–12J show features of porous silicon filters, multiplexers and de-multiplexers.
Figure 12B:
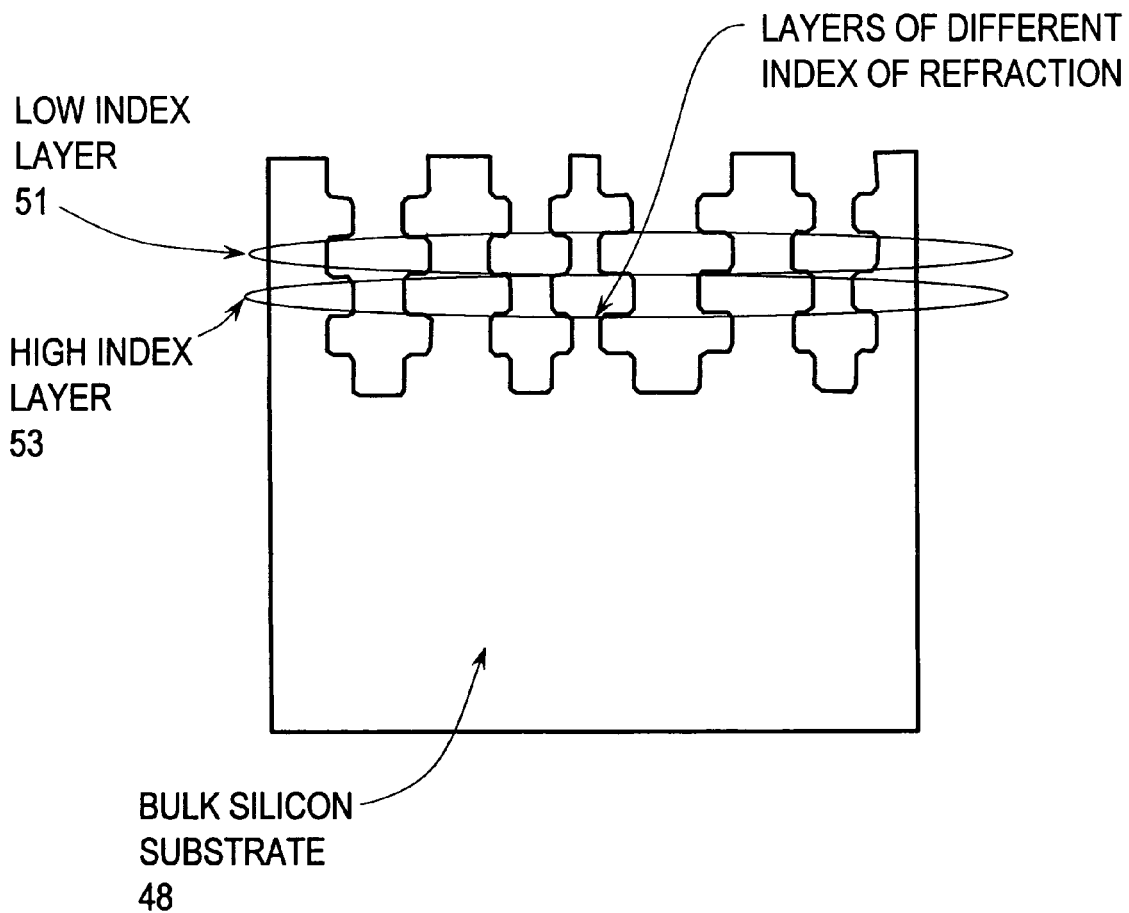
Figure 12C:
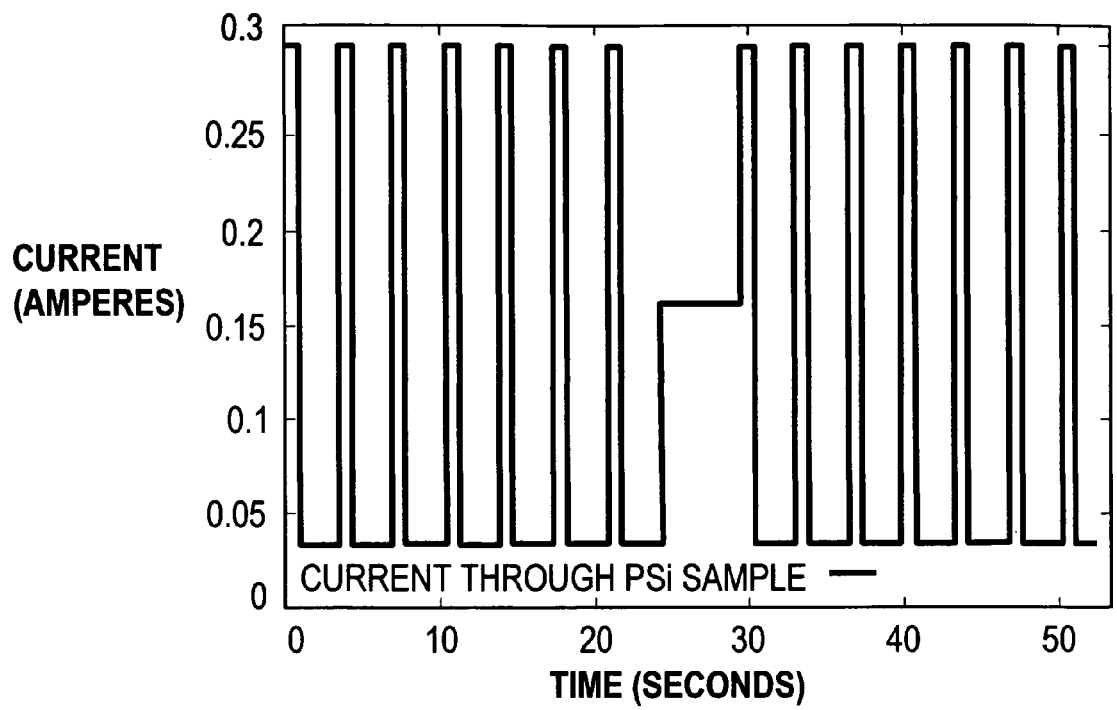
Figure 12D:
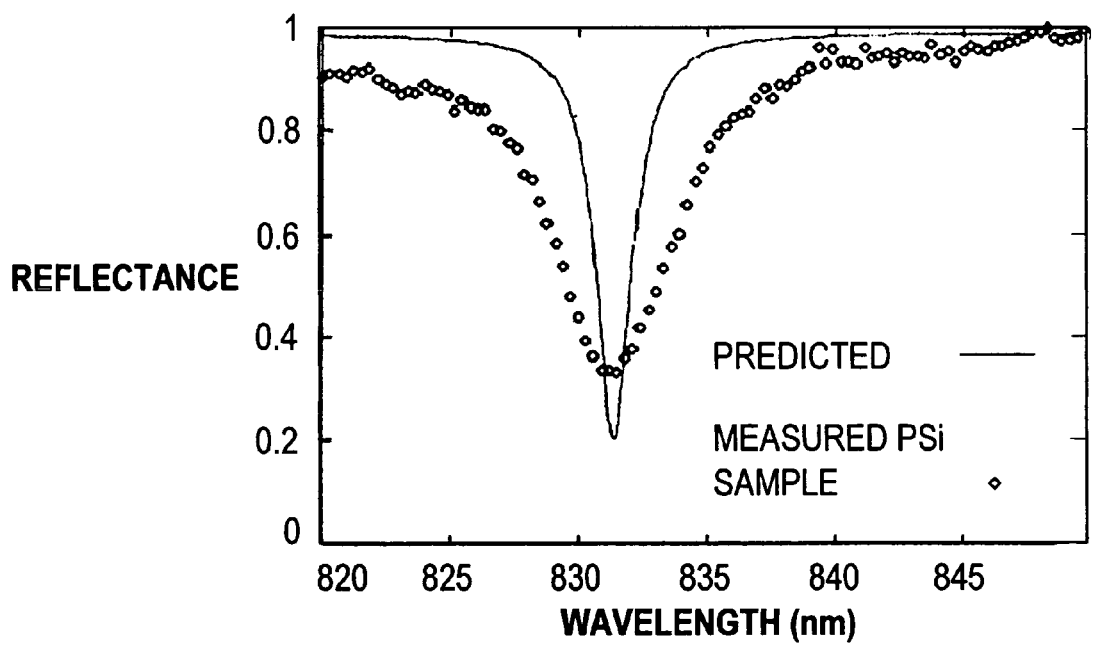
Figure 12E:
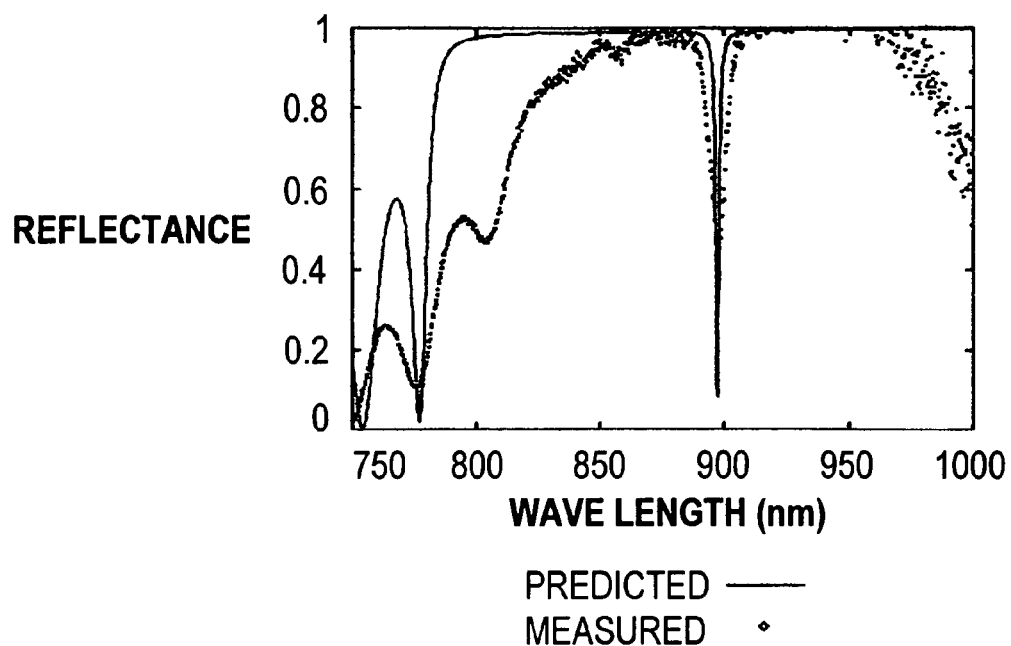
Figure 12F:
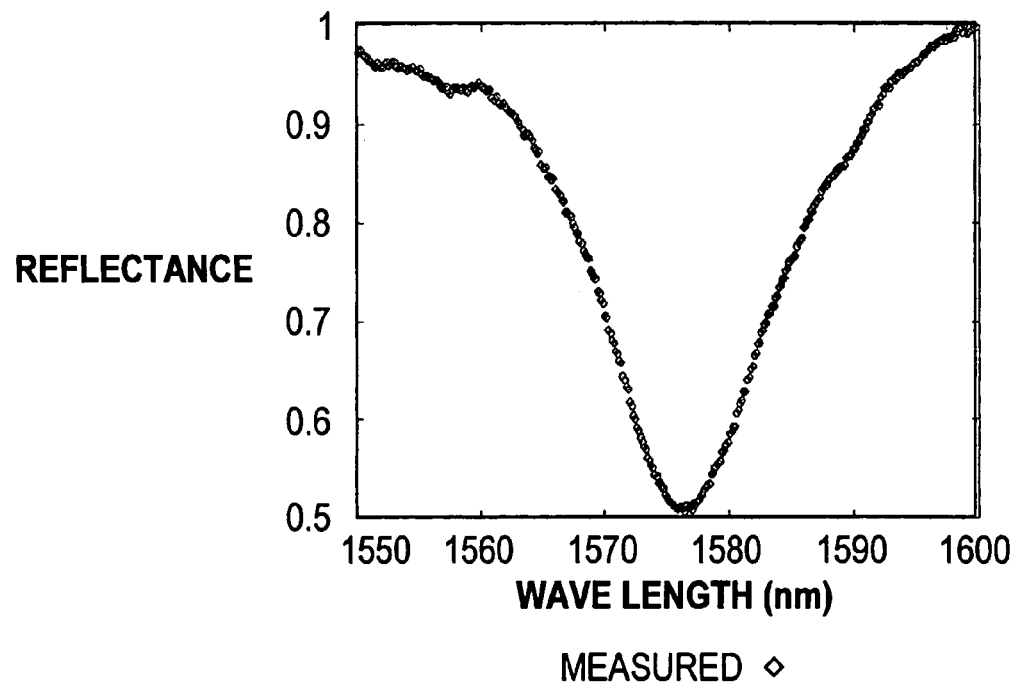

FIG. 12A is a depiction of a portion of a silicon wafer with six layers of varying index of refraction etched in its surface with an electric current supported acid etch porous silicon technology. Porous silicon (PSi) technology is an emerging technology that has many potential applications. A silicon wafer is submerged in hydrofluoric acid (HF) and a current is passed through it. The HF reacts with the silicon and etches nano-pores into the surface. The diameter of the pores is determined by 3 parameters: the current, the HF concentration, and the dopant level of the silicon. Preferred HF concentrations are in the range of about 25 percent to about 50 percent. Preferred silicon doping is about $2.5 \times 10^{16}$ ions/cm$^3$ to about $2.5 \times 10^{17}$ ions/cm$^3$. The etching always occurs at the interface between the HF solution and the silicon substrate at the bottom of the pores. This makes it possible to etch deep into the silicon and form a thick layer of PSi. The diameter of the pores can be changed during the etching process by varying the current. A larger current increases the diameter of the pores, and a smaller current decreases their diameter. In this manner the porosity of the silicon can be varied as a function of depth. Larger porosity (larger diameter pores) makes the silicon less dense which decreases the index of refraction of the PSi layer. And smaller porosity increases the index. Hence, the index of refraction of the PSi can be varied. This ability to vary the index as a function of depth enables the formation of optical filters. FIG. 12B is a drawing showing the general shape of the pours (produced in a silicon substrate 48) greatly magnified in a surface simulating 12 layers. Silicon has an index of refraction of about 3.5 and air has an index of refraction of about 1.00. Since the light we are concerned with has wavelengths much larger than the pores, the light responds to each simulated layer as if it had an index of refraction equal to the weighted average of the air and the silicon volume making up each layer. For example, a low index of refraction is indicated at 51 and a high index of refraction is indicated at 53. FIG. 12C shows a graph of current and time utilized to produce the pattern shown in FIG. 12B and FIG. 12D shows the reflectance from the surface of light at wavelengths of 820 nm to 850 nm. This filter was made with 24 layers as indicated in FIG. 12C. The filter can be made narrower by additional layers. FIG. 12 E shows the results with 29 layers. FIG. 12F is a reflection graph of a porous silicon designed for the wavelength range regularly used for fiber optic communication.

Rugate Porous Silicon Filters

Figure 12G:
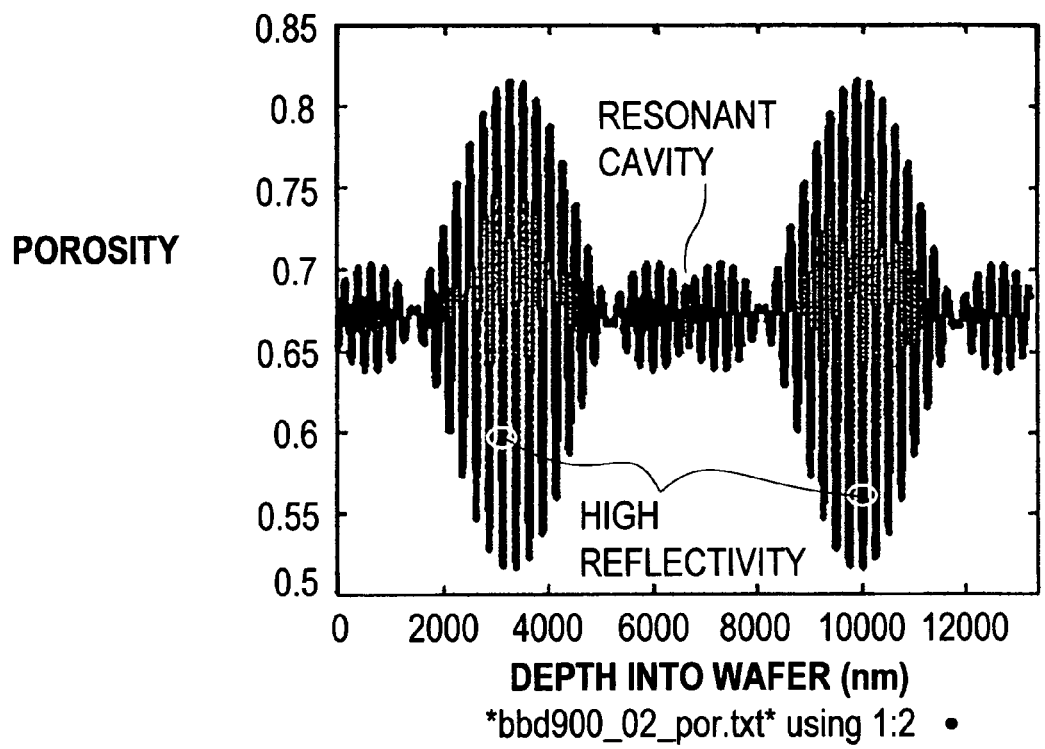
Figure 12H:
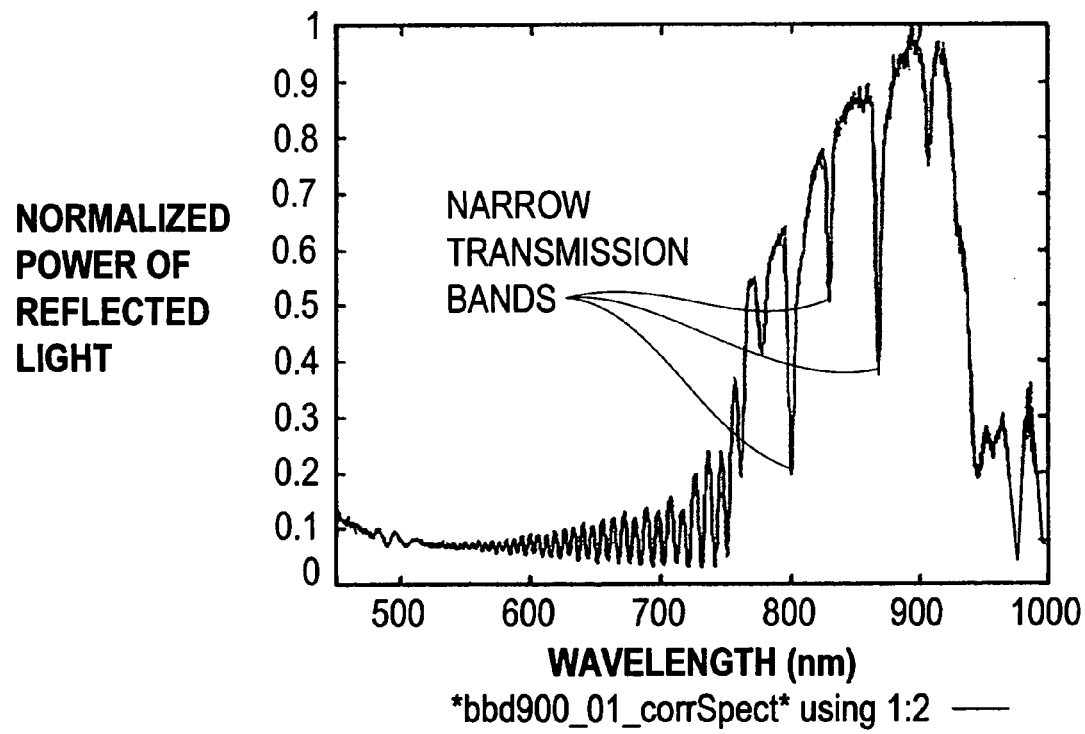

The types of filter that can be formed in PSi is intriguing. Traditional thin-film filters are made by alternating between thin (quarter-wave thick) layers of a high index material and a low index material. In PSi the index variation oscillates continuously between a high and a low value. This type of filter is called a "Rugate filter". Some interesting effects can be achieved, such as eliminating unwanted side-lobes from a narrow band-pass filter. FIG. 12G shows porosity vs depth in the wafer of a Rugate filter made by Applicants and FIG. 12H shows the resulting reflection profile as a function of wavelength. The graph shows three very narrow transmission bands.

Figure 12I:
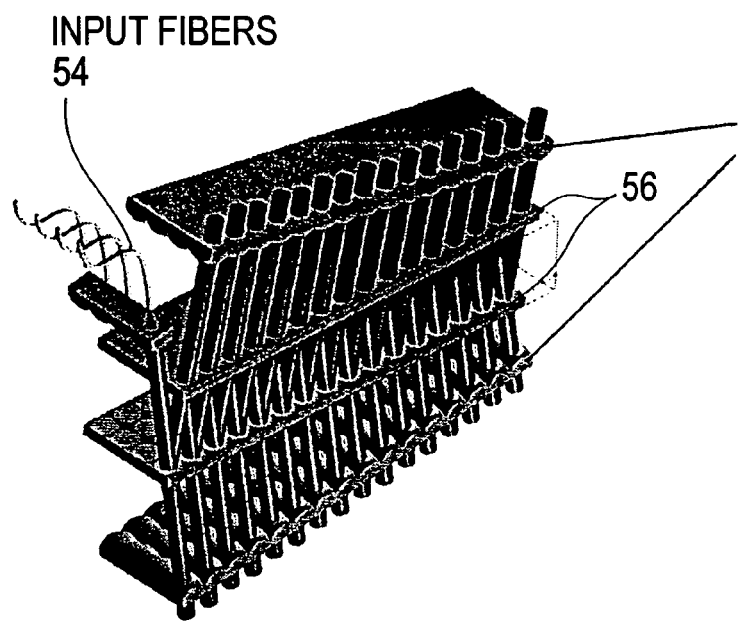
Figure 12J:
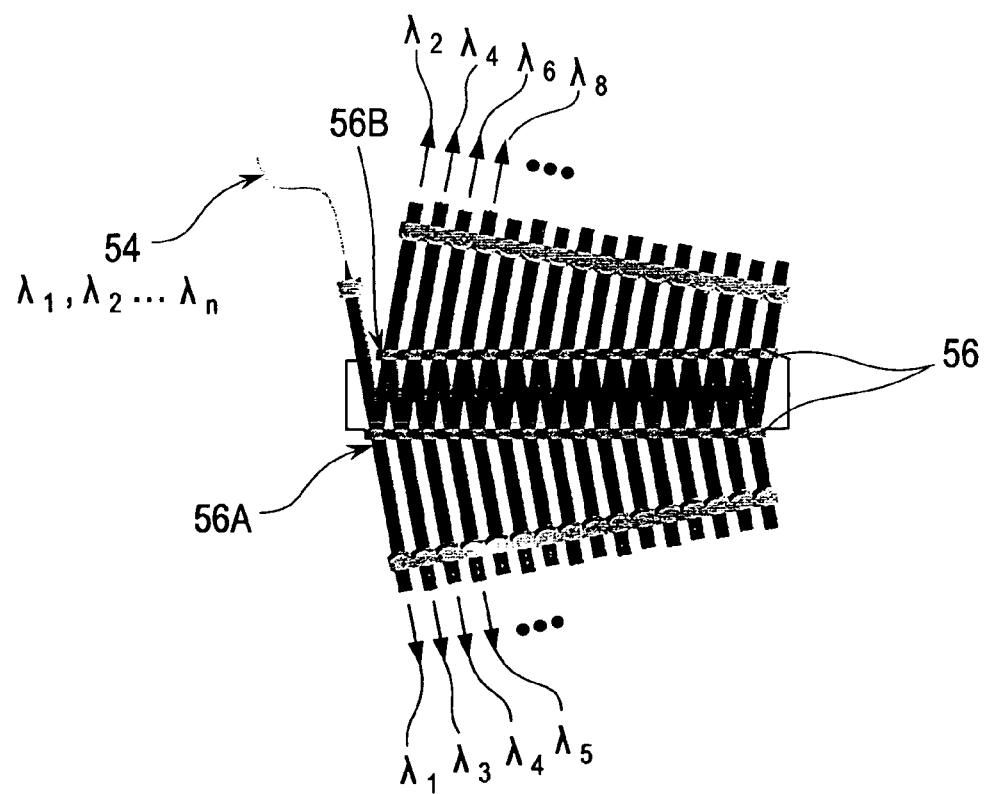
Figure 13A:
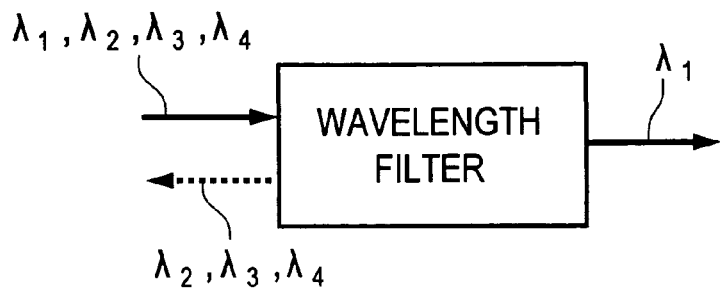
FIGS. 13A–13I show examples of prior art multiplexers, de-multiplexers and switches.
Figure 13B:
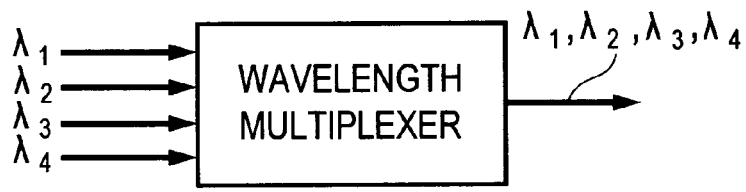
Figure 13C:
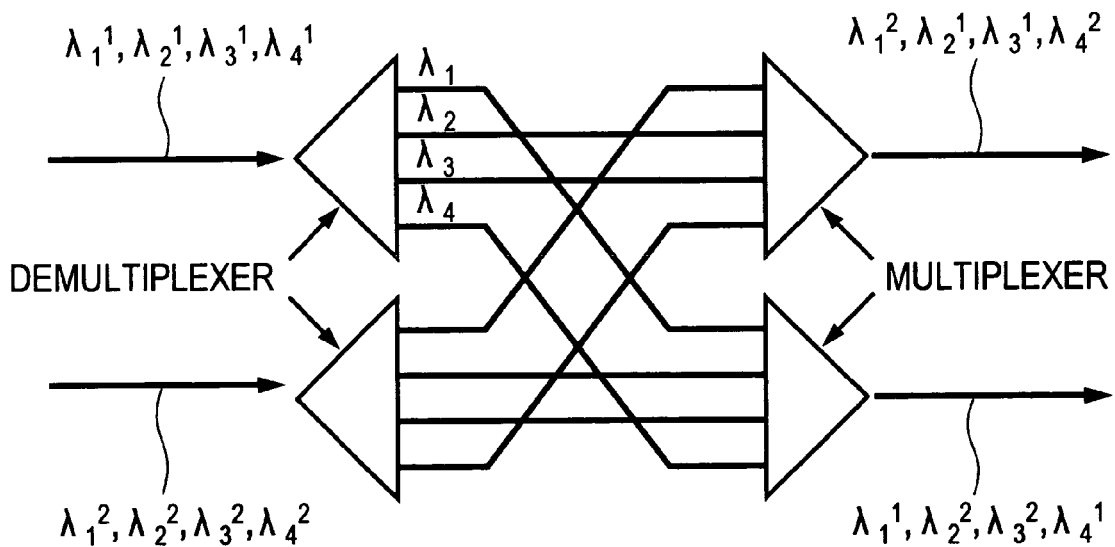
Figure 13D:
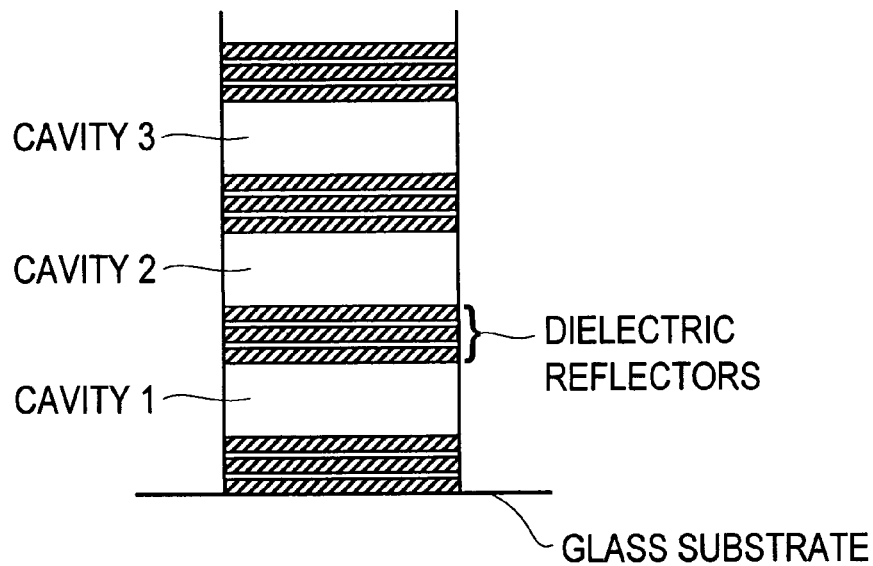
Figure 13E:
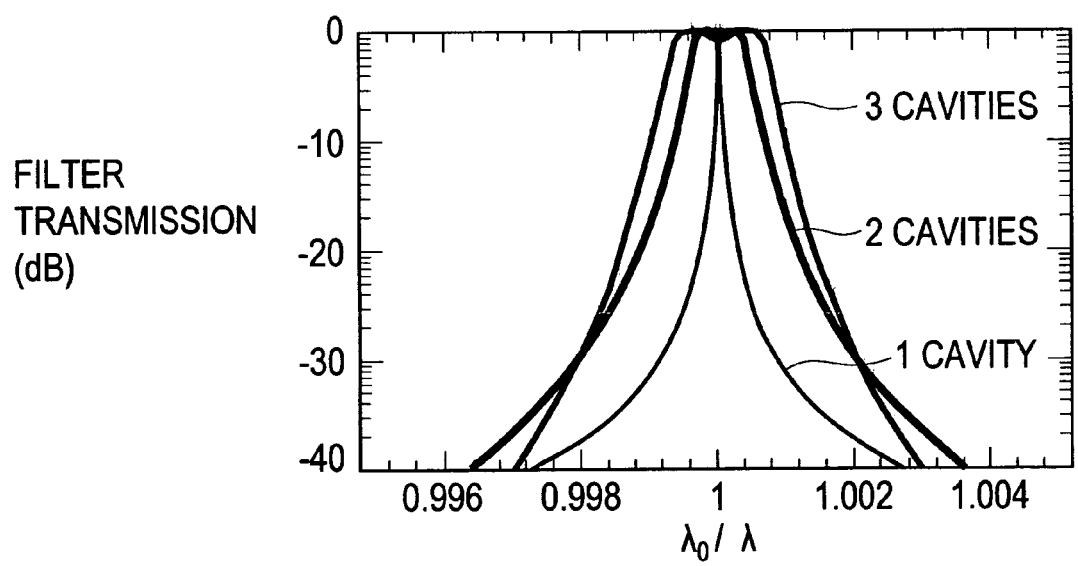
Figure 13F:
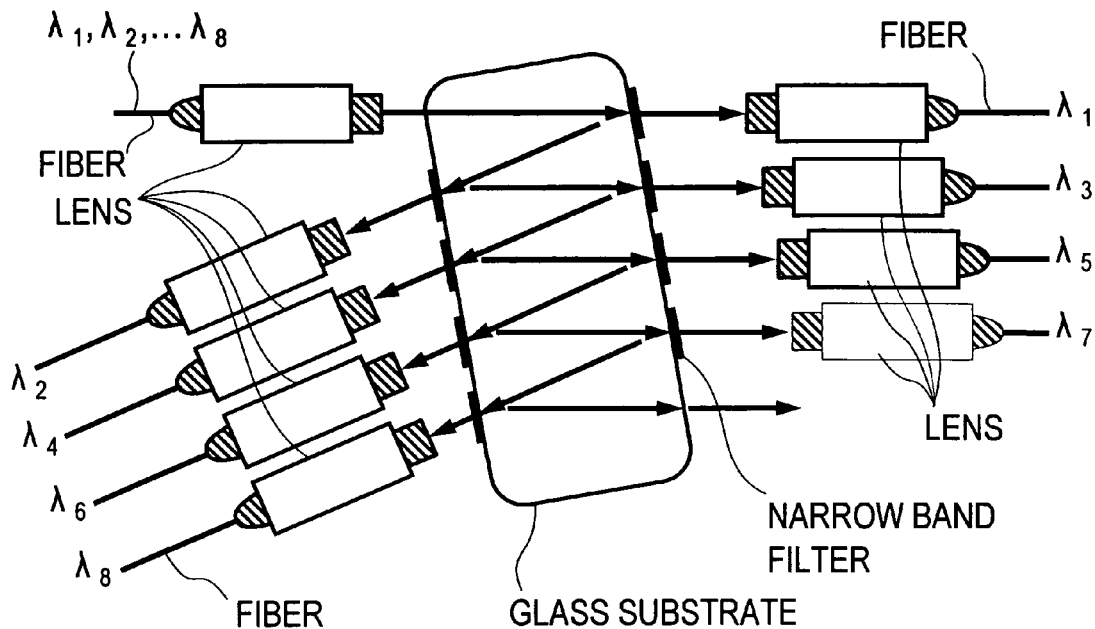
Figure 13G:
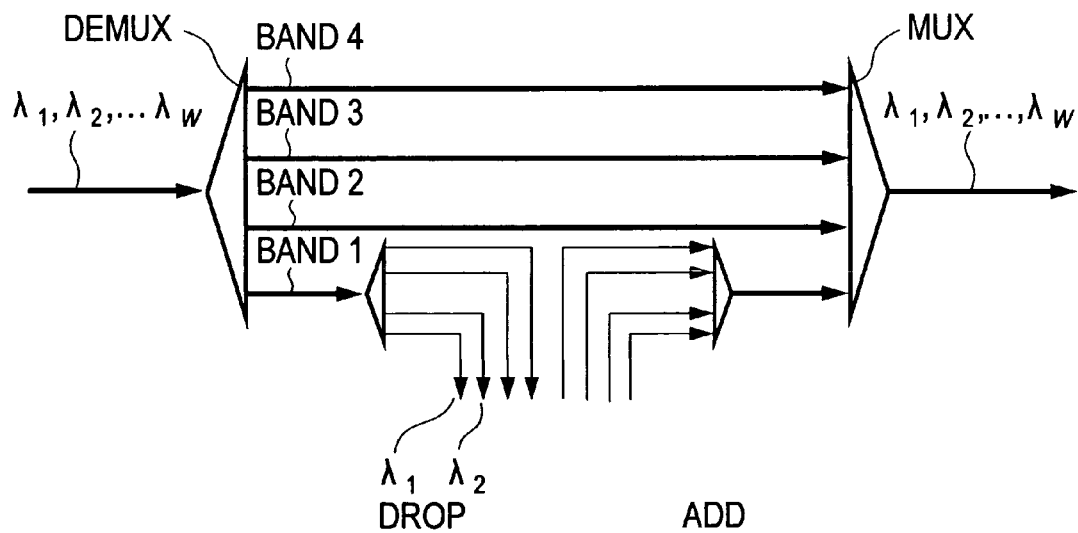
Figure 13H:
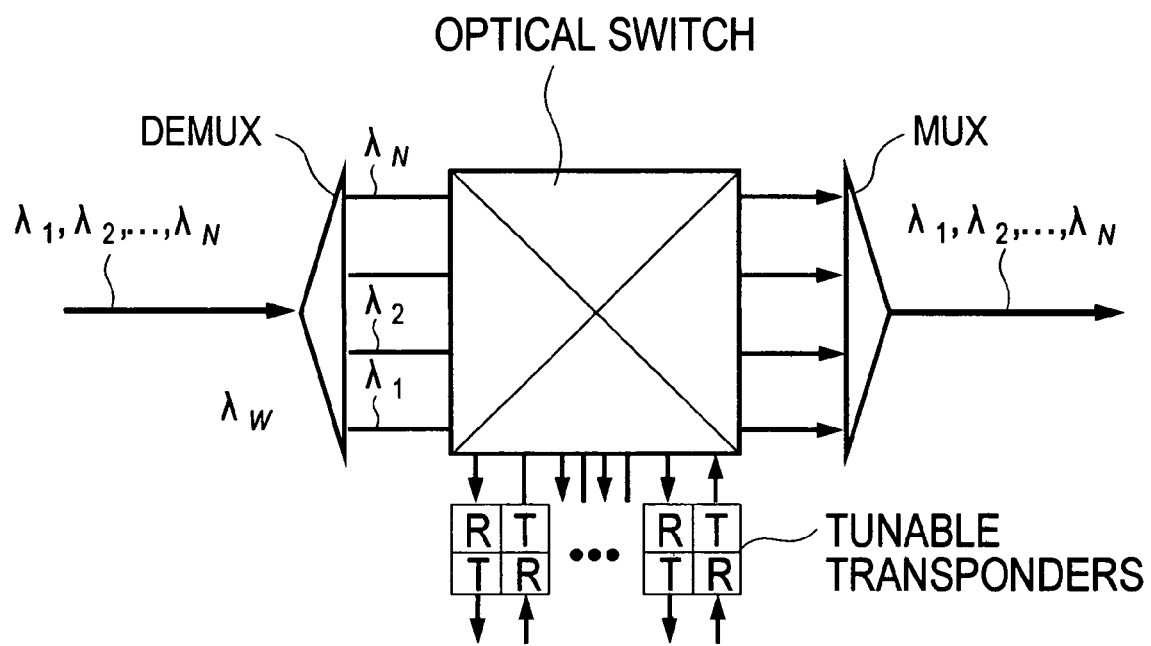
Figure 13I:
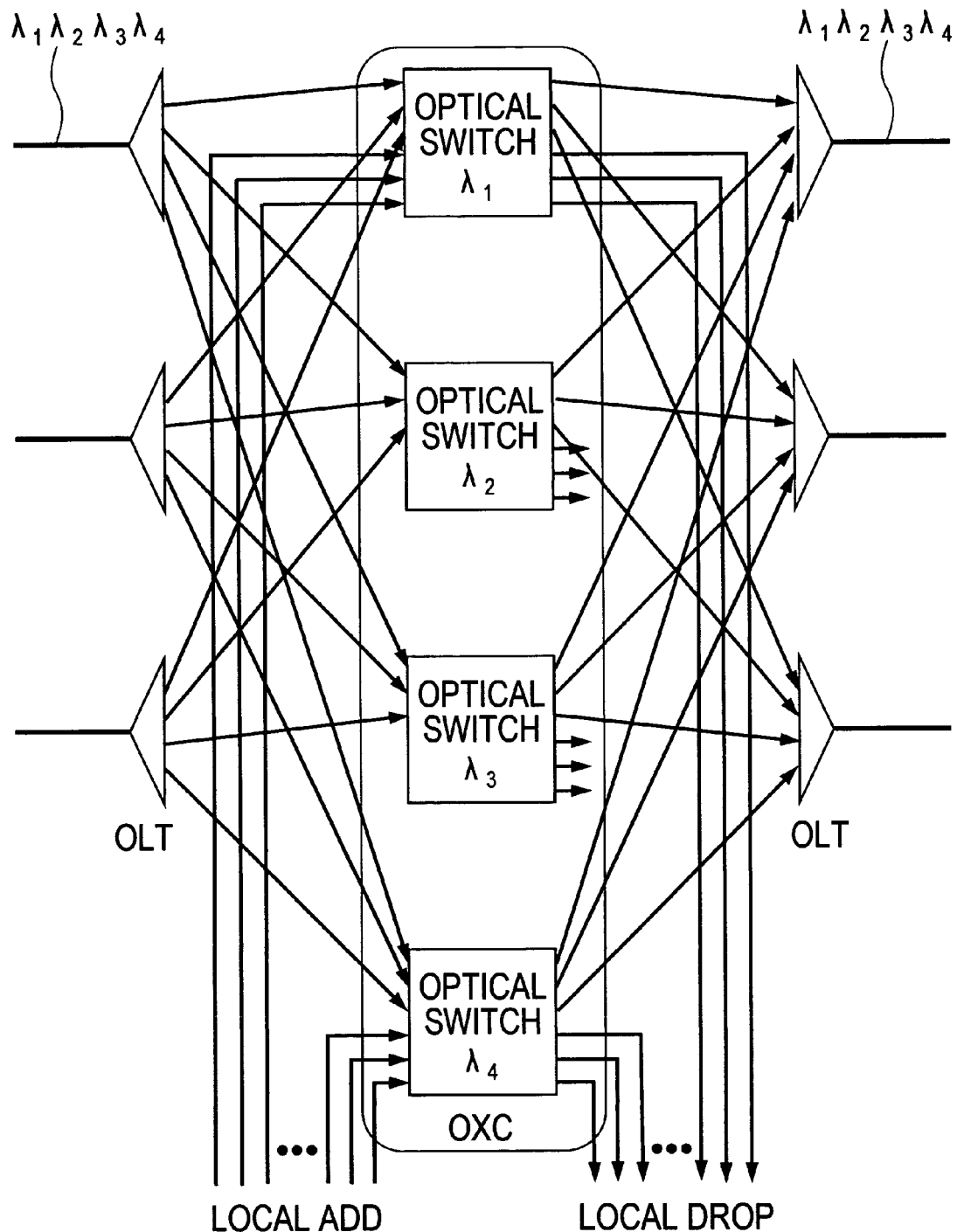

FIGS. 12I and 12J show how porous silicon filter unit can be arranged for multiplexing and de-multiplexing. FIG. 12I shows four fibers 54 providing an incoming communication beam comprising many signals at wavelength bands $\lambda_1$, $\lambda_2$, ... $\lambda_n$. Porous silicon filters designed to transmit individual wavelength bands $\lambda_1, \lambda_2, \ldots \lambda_n$ are shown at 56. For example, filter 56A transmits wavelength range $\lambda_1$ and reflects all other wavelength bands. Filter 56B transmits wavelength band and reflects all other wavelength bands. The wavelength bands $\lambda_1, \lambda_2, \ldots \lambda_n$ bare focused into individual optical fiber by lens arrays 58. This design as shown in FIGS. 12I and 12J uses a series of very narrow-band filters to sequentially separate one wavelength channel at a time from the DWDM beam. At each filter the selected channel is transmitted and the remaining wavelengths are reflected. If visible light is used the silicon substrate may be thinned or removed so that the transmitted light is not completely absorbed. For most optical telecommunications applications silicon is basically transparent to the wavelengths used and the silicon substrate may remain if the doping concentration is not too high. This filtering technique is conceptually simple but may not be the best for DWDM systems with a large number of wavelength channels since the final wavelength must encounter N−1 (N is the total number of wavelength channels in the DWDM beam) filters before it is separated from all other wavelengths. More complicated designs can reduce the total number of filters that any one beam must pass through by having the first several filters transmit more than one wavelength channel. Narrowband filters may then be used to separate the individual wavelength channels from the decimated beams.

Many different prior art Rugate filter designs developed for thin film filters can be used with the porous silicon technique to achieve a narrowband filter with the specifications required for DWDM use. With the porous silicon technique Applicants can simulate stacks of thin film filters by producing multiple series of varying index layers that vary sinusoidally. This is equivalent to the fabrication of two or more relatively broadband reflectors on top of each other. This configuration is the Rugate filter equivalent to the multi-cavity filters found in commercial, discrete, thin-film dielectric filters. This type filter can achieve extremely good wavelength resolution without prohibitive length due to its emulation of Fabry-Perot etalon resonant cavities.

Stacking the filters on top of each other produces index of refraction profile that is extremely high across the C band except for a few very narrow wavelength regions that correspond to the resonant bands of the combined filter structure. This is where the phase change on transmission through the broadband filter matches the phase change on reflection from the second broadband filter. The exact wavelength and width of these transmission regions can be controlled, within a limited range by the design of the length and index profile of the broadband reflective filters.

While there have been shown what are presently considered to be preferred embodiments of the present invention, it will be apparent to those skilled in the art that various changes and modifications can be made herein without departing from the scope and spirit of the invention. For example, the switch shown in FIG. 1A could be scaled up or down as desired. Many types of automatic controls can be incorporated into the switches or used to control the switches. Filters other than porous silicon filters such as thin film filters could be used for multiplexing and de-multiplexing. Fewer or more or zero spare channels could be provided. The source of the alignment beam may be a resonant cavity light emitting diode. In some embodiments beam splitter 56 and sensor 20 could be eliminated with both sets of MEMS mirrors being controlled based on signals from sensor 64. This will make the unit less expensive to fabricate but it will probably be somewhat more complicate to calibrate and control. Sensor 20 could also be installed behind MEMS array 18 with the MEMS mirrors made partially transparent to the alignment beam. Many other techniques are available for aligning an alignment beam with the communication beam in each fiber of the switch. There are many alternate methods of arranging the incoming fibers in the input portion of the switch. For example, the fibers could be aligned with a precision drilled substrate as described in the '879 parent application. The same applies to the fiber alignment in the output portion. Small mirror arrays other than MEMS mirror arrays could be substituted for the MEMS mirror arrays. One processor could be used instead of the two shown in FIGS. 1A and 1B. There are a large number of applications for the present invention other than the two important ones discussed in detail. For example, the switch could be used in local intra-office or intra-factory communication systems where very high data rate communication is important. Signal grooming features, gain control and amplifiers could be incorporated into the switch. ROADM units of the present invention can be used to support express local and regional communication traffic. The switch of the present invention can be utilized in all of the system architectures including point-to-point, ring (hubbed and meshed). Therefore, the scope of the patent should be determined by the appended claims and their legal equivalence and not by the examples that have been given.

We claim:

1. An optical fiber optic cross-connect switch for cross connecting optical fibers in an input set of optical fibers to fibers in an output set of fibers utilizing alignment beams that are co-axial with communication beams transmitted through said optical fibers, such switch comprising:
    A) an alignment beam insertion means for aligning an alignment beam co-axially with the communication beam carried by each fiber in the input set of optical fibers to define a communication-alignment beam for each fiber,
    B) an input array structure,
    C) a first network of confined optical pathways for directing each communication-alignment beam to a specific exit aperture in said input array structure, said exit apertures for all of the communication-alignment beams being arranged in a pattern defining an input array such that each communication-alignment beam can be identified by the location of its exit aperture in the input array structure,
    D) an output array structure,
    E) a second network of confined optical pathways for directing the communication beam portion of each cross connection beam to a specific exit aperture in said output array structure, each confined optical pathway defining an entrance aperture said entrance apertures for all of the pathways being arranged in a pattern defining an output array such that each pathway can be identified by the location of its entrance aperture in the output array structure,
    F) a first lens array for forming each communication-alignment beam into a cross-connection beam,
    G) a second lens array for focusing the communication portion of the cross connection beam into the entrance apertures of the second network of confined optical pathways
    H) a first mirror array and a second mirror array, said first mirror array having a plurality of mirrors with each mirror positioned to intercept one of the cross connection beams and direct it to a mirror in the second mirror array and said second mirror array having a plurality of mirrors with each mirror positioned to intercept one of the cross connection beams and direct it to a micro lens in said second lens array,
    I) a first detector array positioned to monitor at least a portion of each of the alignment beam portion of each cross connection beam, and
    J) at least one processor programmed to control positions of the mirrors in the first and second mirror arrays based at least in part on beam direction information provided by said first detector array.

2. A switch as in claim 1 wherein said first detector array is transparent to said communication beam portions of said cross connection beams, permitting alignment beam detection while allowing the communication beams to pass through the detector array to the input apertures of the confined pathways in the output array structure.

3. A switch as in claim 1 wherein the first and second network of confined optical pathways are a first and second network of optical fibers.

4. A switch as in claim 3 and also comprising at least two arrays of ferrules for precisely arranging said first and second network of optical fibers.

5. A switch as in claim 1 wherein said first array is a first micro-lens array and said second lens arrays is a second micro-lens array.

6. A switch as in claim 1 wherein said first mirror array is a first MEMS mirror array and said second mirror array is a second MEMS array.

7. A switch as in claim 1 wherein said first detector array is transparent to the communication beam permitting alignment beams detection while allowing the communication beams to pass through the detector array to the input apertures of the confined pathways in the output array structure.

8. A switch as in claim 1 and further comprising a second detector array and a beam splitter located optically between the first and second mirror arrays and positioned to direct a portion of each alignment beam of the cross connection beam to said first detector array.

9. A switch as in claim 7 and further comprising a second processor programmed to control positions of the mirrors in the first mirror arrays based at least in part on beam direction information provided by said second detector array.

10. A switch as in claim 1 wherein said input set of optical fibers and said output set of optical fibers are each at least 16 optical fibers.

11. A switch as in claim 1 wherein said input set of optical fibers and said output set of optical fibers are each at least 256 optical fibers.

12. A switch as in claim 1 wherein said switch is configured to operate as a cross. connect switch in a national scale network.

13. A switch as in claim 1 wherein said switch is configured to operate as a part of a ROADM unit.

14. A switch as in claim 1 wherein said switch is configured to operate as a part of an intra-office or intra-factory communication system.

15. A switch as in claim 1 and also comprising signal amplifiers.

16. A switch as in claim 1 and also comprising automatic gain control.

17. A switch as in claim 1 and also comprising signal grooming components.

18. A switch as in claim 1 and also comprising multiplexers and de-multiplexers.

19. A switch as in claim 18 wherein said multiplexers and de-multiplexers comprise porous silicon filters.

20. A switch as in claim 19 wherein said porous silicon filters are designed as Rugate filters.

21. A switch as in claim 6 wherein each of said MEMS mirrors in said first and second mirror arrays comprises a mirror element fabricated in a silicon wafer and mirror controls fabricated in a silicon wafer.

22. A switch as in claim 21 wherein said mirror controls comprise four electrodes producing electrostatic forces to control mirror position in said mirror.

23. A switch as in claim 22 wherein each of said electrodes define a top surface located directly under said mirror element and a bottom surface wherein electric power for said electrodes is provided through the bottom surface of said electrode.

* * * * *